US008881915B2

(12) United States Patent
Yokota et al.

(10) Patent No.: US 8,881,915 B2
(45) Date of Patent: *Nov. 11, 2014

(54) POLYMERIC POROUS HOLLOW FIBER MEMBRANE

(75) Inventors: Hideyuki Yokota, Ohtsu (JP); Noriaki Kato, Ohtsu (JP); Hirofumi Ogawa, Ohtsu (JP); Junsuke Morita, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 764 days.

This patent is subject to a terminal disclaimer.

(21) Appl. No.: 12/298,456

(22) PCT Filed: Apr. 25, 2007

(86) PCT No.: PCT/JP2007/058919
§ 371 (c)(1),
(2), (4) Date: Dec. 22, 2008

(87) PCT Pub. No.: WO2007/125943
PCT Pub. Date: Nov. 8, 2007

(65) Prior Publication Data
US 2009/0110900 A1 Apr. 30, 2009

(30) Foreign Application Priority Data

Apr. 26, 2006 (JP) ................. 2006-122042
Nov. 28, 2006 (JP) ................. 2006-319646
Apr. 20, 2007 (JP) ................. 2007-111754

(51) Int. Cl.
| | | |
|---|---|---|
| B01D 39/16 | (2006.01) | |
| B01D 63/02 | (2006.01) | |
| B01D 63/06 | (2006.01) | |
| B01D 69/08 | (2006.01) | |
| D01F 1/08 | (2006.01) | |
| B32B 3/12 | (2006.01) | |
| B01D 71/68 | (2006.01) | |
| B01D 71/44 | (2006.01) | |
| B01D 69/02 | (2006.01) | |

(52) U.S. Cl.
CPC ........ *B01D 69/087* (2013.01); *B01D 2325/022* (2013.01); *B01D 2325/38* (2013.01); *B01D 2325/36* (2013.01); *B01D 71/68* (2013.01); *B01D 69/08* (2013.01); *B01D 71/44* (2013.01); *B01D 69/02* (2013.01)
USPC ............ 210/500.23; 210/500.37; 210/500.41; 210/500.42; 428/315.5; 428/315.7; 428/315.9; 428/398

(58) Field of Classification Search
CPC ...... B01D 69/02; B01D 69/08; B01D 69/087; B01D 71/68; B01D 71/44; B01D 2325/38; B01D 2325/022; B01D 2325/36; D01F 1/08
USPC .......... 210/500.23–500.43; 428/315.5–315.9, 428/398, 400
See application file for complete search history.

(56) References Cited

U.S. PATENT DOCUMENTS

| | | | | |
|---|---|---|---|---|
| 5,340,480 | A * | 8/1994 | Kawata et al. | 210/500.23 |
| 5,919,370 | A | 7/1999 | Rottger et al. | |
| 6,001,406 | A | 12/1999 | Katzke et al. | |
| 6,354,444 | B1 * | 3/2002 | Mahendran et al. | 210/490 |
| 6,432,309 | B1 | 8/2002 | Fuke et al. | |
| 6,802,971 | B2 * | 10/2004 | Gorsuch et al. | 210/500.23 |
| 6,890,435 | B2 | 5/2005 | Ji et al. | |
| 7,153,534 | B2 | 12/2006 | Rehmanji et al. | |
| 8,136,675 | B2 * | 3/2012 | Buck et al. | 210/500.23 |
| 8,225,941 | B2 * | 7/2012 | Ogawa et al. | 210/500.23 |
| 2003/0141251 | A1 | 7/2003 | Ji et al. | |
| 2004/0043119 | A1 | 3/2004 | Rehmanji et al. | |
| 2005/0205488 | A1 * | 9/2005 | Shinada et al. | 210/490 |

FOREIGN PATENT DOCUMENTS

| | | | |
|---|---|---|---|
| JP | 06-165926 | A | 6/1994 |
| JP | 06-296686 | A | 10/1994 |
| JP | 3594946 | B2 | 12/1994 |
| JP | 07-022690 | B2 | 3/1995 |
| JP | 09-047645 | A | 2/1997 |
| JP | 10-042852 | A | 2/1998 |
| JP | 11-506387 | A | 6/1999 |
| JP | 11-309355 | A | 11/1999 |

| | | |
|---|---|---|
| JP | 2000-308814 A | 11/2000 |
| JP | 2002-515236 A | 5/2002 |
| JP | 2003-147194 A | 5/2003 |
| JP | 2004-267177 A | 9/2004 |
| JP | 2005-515881 A | 6/2005 |
| WO | WO 2004/056460 A1 | 7/2004 |

OTHER PUBLICATIONS

Borneman, "Selective Removal of polyphenols and brown colour in apple juices using PES/PVP membranes in a single ultrafiltration process", Separation and Purfication Technology 22-23, (2001) 53-61.*

European Patent Office, Extended European Search Report for European Patent Application No. 07742354 (Feb. 29, 2012).

International Bureau of WIPO, International Preliminary Report on Patentability for International Patent Application No. PCT/JP2007/058919 (Oct. 28, 2008).

Japanese Patent Office, International Search Report for International Patent Application No. PCT/JP2007/058919 (Aug. 14, 2007).

* cited by examiner

*Primary Examiner* — Jennifer A Steele
(74) *Attorney, Agent, or Firm* — Leydig, Voit & Mayer, Ltd.

(57) ABSTRACT

PURPOSE: To provide a polymeric porous hollow fiber membrane which exhibits excellent fractionation performance and excellent permeability in treatment of a variety of aqueous fluids and also shows sufficient strength when incorporated into a module or used to treat a fluid, and which is excellent in aging stability in these performances and characteristics and is also excellent in membrane performance recoverability by washing, and which is especially suitable for treatment of a polyphenol-containing beverage and is expected to effectively harmonize the flavor of such a beverage.

SOLUTION: A polymeric porous hollow fiber membrane of the present invention is characterized in that (a) the hollow fiber membrane has skin layers on its inner and outer surfaces;
(b) the diameters of the pores in the inner surface are smaller than the diameters of the pores in the outer surface;
(c) the porosity tends to increase from the inner surface toward the outer surface, and then tends to decrease from at least one portion having a maximum porosity, of the wall section of the membrane, toward the outer surface; and
(d) the hollow fiber membrane satisfies a relationship of 2 [%]≤DR≤20 [%], wherein the critical diameter of a fine particle to be removed, found by a fine particle-passing test, is $\phi$max [μm]; the diameter of the pores in the inner surface is dIS [μm]; and the proportion of the pores with dIS exceeding $\phi$max is DR [%].

This polymeric porous hollow fiber membrane is also characterized in that the adsorption of polyphenol per a surface area of 1 $m^2$ defined by the inner and outer surfaces of the membrane is from 50 to 500 mg.

14 Claims, 5 Drawing Sheets

POLYMERIC POROUS HOLLOW FIBER MEMBRANE

TECHNICAL FIELD

The present invention relates to a polymeric porous hollow fiber membrane for use in treatment of an aqueous fluid. In particular, the present invention pertains to a polymeric porous hollow fiber membrane which can sustain stable membrane performance over a long period of time and which is excellent in membrane performance recoverability by washing, because of the following characteristic structure thereof: that is, the polymeric porous hollow fiber membrane comprises a hydrophobic polymer and a hydrophilic polymer, and has skin layers on its inner and outer surfaces, respectively, and has such a porosity that increases from the inner surface toward the outer surface and then decreases from at least one portion having a maximum porosity, of the wall section of the membrane, toward the outer surface; and there is a specific relationship between the diameters of the pores in the inner surface which mainly determine the separation performance of the membrane, and the critical diameter of particles to be removed.

The present invention also relates to a polymeric porous hollow fiber membrane which shows a polyphenol adsorption of from 50 to 500 mg per a surface area of 1 $m^2$ defined by both the inner and outer surfaces of the membrane and which is especially suitable to filter a beverage containing polyphenol, and the use of this polymeric porous hollow fiber membrane makes it possible to optimize the interaction thereof with polyphenol which is a flavor component of a beverage and is also an unpleasant taste component thereof, to thereby harmonize the flavor of the beverage.

BACKGROUND OF THE INVENTION

Hollow fiber membranes for use in treatment of aqueous fluids are widely used for industrial applications such as precision filtration, ultrafiltration, etc. and for medical applications such as dialysis, filtration, and diafiltration of blood. Recently, filtration by hollow fiber membranes has been widely employed in production process of beverages containing polyphenol such as wines and beer. As materials for these membranes, there are used cellulose, cellulose acetate, polyethylene, polysulfone, poly(vinylidene fluoride), polycarbonate, polyacrylonitrile, etc.

For example, the following points are given as essential properties required for such hollow fiber membranes:

(1) a high removing ability to a substance to be removed, (2) a high permeability to a substance to be permeated (i.e., fractionation performance as integral properties (1) and (2)), (3) a high permeability to a fluid to be treated (permeability) (i.e., membrane performance as integral properties (1), (2) and (3)), (4) a sufficiently high strength to hardly cause rupture or leakage (strength), (5) no aging degradation in fractionation performance (fractionation sustainability), and (6) no aging degradation in permeability to a fluid to be treated (permeability sustainability) (i.e., membrane performance sustainability as integral properties (5) and (6)).

Additionally, the following properties are required for hollow fiber membranes for use in filtration of beverages, which are required to be used over a long period of time:

(7) excellent recovery of fractionation performance by washing (i.e., fractionation recoverability), and (8) excellent recovery of permeability by washing (i.e., permeability recoverability) (membrane performance recoverability as integral properties (7) and (8)).

Conventionally, most of hollow fiber membranes have been developed from the viewpoint of improvement of filtration performance as the property (3), and other properties sometimes have been sacrificed. General measure to improve the permeability of membranes is to increase the pore diameters of the membranes, which simultaneously induces degradation in the fractionation performance and strengths of the membranes.

Hollow fiber membranes are roughly classified by their membrane structures, to symmetrical membranes in which the pore diameters are substantially not changed in the thickness directions, and asymmetrical membranes in which the pore diameters are continuously or discontinuously changed and thus differ at the inner surfaces, inner portions and outer surfaces of the membranes. The symmetrical membranes show high resistance to the flow of fluids at their entire thicker portions thereof when used for filtration, and therefore, it is difficult to achieve a large flow amount, and the membranes are liable to clog due to solutes (i.e., substances to be removed).

Both the surface layer effect due to the pore diameter of the membrane surface and the depth effect due to the wall portion of the membrane contribute to removal of a subject substance through filtration of a fluid. Separation depending on mainly the depth effect is expected to achieve sharp fractionation performance, but is difficult to achieve a larger flow amount, since this separation requires for a membrane to have a certain thickness. Consequently, a membrane of this type has a defect in that the flow amount tends to decrease with time because of the clogging of the membrane due to a substance to be removed. The contribution of the depth effect is relatively large in the above-described symmetrical membrane, and thus, this defect is considered to be easily revealed in the symmetrical membrane.

Under such circumstances, there have been studied asymmetrical membranes having thereon thin skin layers which mainly determine the fractionation performance and permeability of the membranes. Patent Publication 1 discloses an aromatic polysulfone hollow fiber membrane which has, in its inner portion, pores in the smooth shapes of ellipse or circle, having a maximum longer axis of at least 0.1 μm, and which has a skin layer on its outer surface and has no macro void in its section. According to this technique, the pores in the shape of ellipse or circle make it possible to achieve sharp fractionation performance to thereby decrease a local force applied to a blood cell component during filtration of blood, so that a problem such as hemolysis or the like can be solved. While this effect surely can be expected by controlling the shapes of the pores, the study on the structure of the sectional portion of the membrane is insufficient, and especially, careful and keen attentions are not paid to the sustainability and recoverability of the membrane performance.

Patent Publication 2 discloses a hollow fiber type precision filtration membrane which comprises aromatic polysulfone and polyvinyl pyrrolidone and which is specified in polyvinyl pyrrolidone content, membrane structure and strength at break. In this membrane, the pore diameter of the inner surface is controlled in order to improve the permeability of the membrane. Specifically, the pore diameter of the inner surface should be smaller than the diameter of a substance which is inhibited from passing by filtration: that is, the pore diameter is from 0.01 to 1 μm, preferably from 0.05 to 0.5 μm. However, an error in measurement of the pore diameter tends to be larger, depending on the shape or size of the pore.

Therefore, it is essential that the diameter of a substance to be inhibited from passing in filtration should be from 0.015 to 1 μm. It is also described in this publication that the strength at break of this membrane is at least 50 kgf/cm$^2$, since a rupture strength of lower than 50 kgf/cm$^2$ will frequently cause leakage. Thus, this membrane is not suitable for practical use. It is also described that, in case of blood as a fluid to be filtered, the concentration of hydrophilic polyvinyl pyrrolidone in the inner surface of the membrane is from 20 to 45% by weight in order to inhibit the adsorption of blood plasma protein. According to this technique, this membrane is developed in consideration of high strength, high water-permeating performance (high permeability) and prevention of clogging (fractionation performance sustainability), and in fact, these subject matters are considered to be solved to a certain degree. However, there is no description about membrane performance sustainability and membrane performance recoverability by washing which are required when this membrane is used as a membrane for obtaining tap water or a membrane for treating beverages over a long period of time. Thus, this membrane is insufficient in study of these problems.

Patent Publication 3 discloses a semipermeable membrane with a multi-layer structure, which comprises a ε-caprolactam soluble polymer, and comprises a separation layer A having a separation limit of from 500 to 5,000,000 Dalton, a support layer B having a hydrodynamic resistance negligibly small as compared with those of the layers A and C, and the layer C having pores with diameters larger than those of the pores of the separation layer A and smaller than those of the pores of the support layer B. Described as the subject matter to be achieved by this technique is to provide a membrane which has a designated separation limit and can have a low, medium or high permeability as required, by accurately controlling the separation limit and hydrodynamic permeability, while accurately controlling the hydrodynamic permeability independently of the separation limit. However, the strength, membrane performance sustainability and membrane performance recoverability of this membrane are taken out of consideration.

Patent Publication 4 discloses a membrane having a structure similar to the above-described membrane. This membrane has pores with a pore diameter of 500 nm or less at a layer in the proximity of the membrane inner wall surface and has a pore distribution at its section in the membrane thickness direction, which distribution has at least one pore with a maximum diameter of a specified value. This technique substantially relates to a medical membrane excellent in biocompatibility, which is intended to inhibit a high molecular weight protein from infiltrating the membrane and to decrease a contact area of the membrane to the high molecular weight protein to thereby improve the biocompatibility, by forming a minute inner surface which is to contact blood. A minute structure in the proximity of the outer surface of the membrane, following the maximum pore portion of the section of the membrane, is formed to inhibit infiltration of an endotoxin fragment from the outer surface of the membrane. That is, the minute-coarse-minute structure of the membrane is necessary as a blood-treating membrane for its substance-removing ability, biocompatibility and inhibition of infiltration of endotoxin. However, any relationship with other properties such as membrane performance sustainability and membrane performance recoverability is not described.

Patent Publication 5 discloses a method for removing polyphenol from a liquid containing polyphenol by using, in this liquid, polyvinyl polypyrrolidone (hereinafter referred to as PVPP) and a substance having a laccase enzymatic activity in combination, from the viewpoint of treatment of polyphenol. This technique is characterized by the steps of polymerizing polyphenol so as to have a size liable to be adsorbed onto PVPP, using the substance having the laccase enzymatic activity; adsorbing the polyphenol onto PVPP; and removing the adsorbed polyphenol. In this technique, a step of removing the PVPP used for treatment is indispensable, and therefore, the steps of this method is complicated.

Patent Publication 6 discloses a technique for efficiently clarifying beer by a single step of treatment using a composition containing silica xerogel and crosslinked polyvinyl pyrrolidone. However, this technique also requires a step of removing the composition after the clarifying treatment.

Patent Publication 7 discloses a method for stabilizing a beverage containing a hazing material, the method comprising the steps of bringing the beverage into contact with a water-insoluble porous hydrophilic matrix, and recovering the beverage from the matrix. In this publication, a membrane is given as an example of the forms of the matrix. However, there is no description about the structure and features of the membrane in case where the membrane is selected as the matrix. This publication substantially relates to a treating method using a column charged with beads type matrix. In this technique, the consideration of separation of a permeated substance and a substance to be removed, by way of membrane filtration, is insufficient.

As has been described above, there is not found in the known techniques, any technical idea to obtain a membrane particularly suitable for use in treatment of a beverage containing polyphenol, by taking into consideration the interaction of the membrane with polyphenol, the structure of the membrane and the content of a hydrophilic polymer in combination.

Patent Publication 1: JP-B-07-022690/1995
Patent Publication 2: Patent Registration No. 3594946
Patent Publication 3: JP-A-11-506387/1999
Patent Publication 4: JP-A-09-047645/1997
Patent Publication 5: JP-A-2004-267177/2004
Patent Publication 6: JP-A-2002-515236/2002
Patent Publication 7: JP-A-10-042852/1998

BRIEF DESCRIPTION OF THE DRAWINGS

FIG. 11 shows the electron microscopic photograph (magnification: 1,000) of the outer surface of the PVDF-MF membrane of Comparative Example 2.

FIG. 12 shows the electron microscopic photograph (magnification: 150) of the section of the PVDF-MF membrane of Comparative Example 2.

DISCLOSURE OF THE INVENTION

Figure 1:
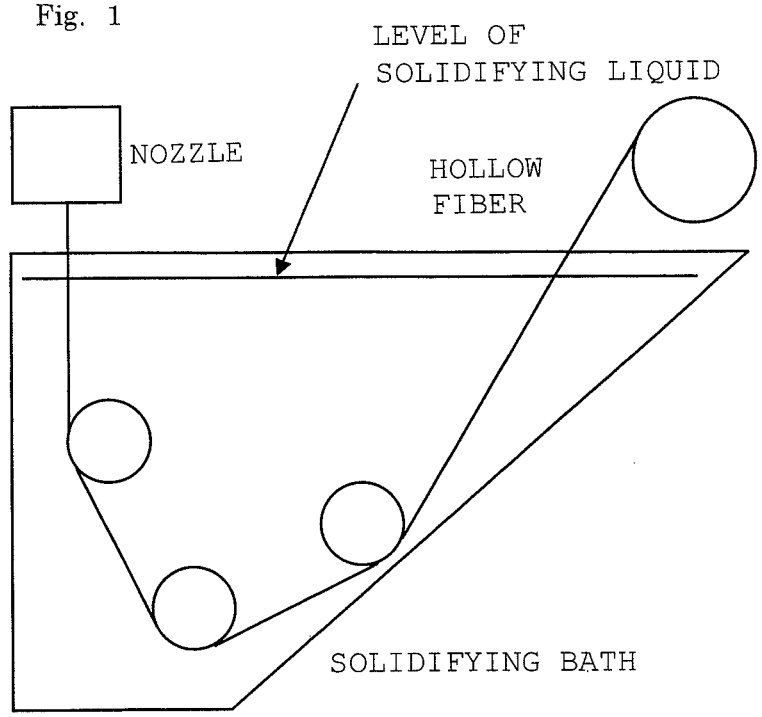
FIG. 1 shows a schematic diagram illustrating the feeding of a hollow fiber membrane in a coagulating bath in Example 1 of the present application.
Figure 2:
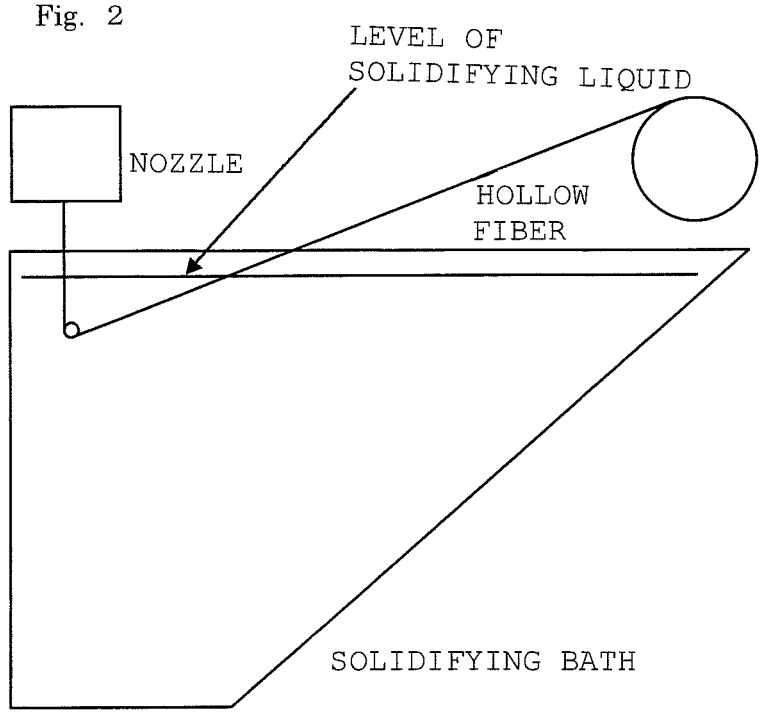
FIG. 2 shows a schematic diagram illustrating the feeding of a hollow fiber membrane in a coagulating bath in Comparative Example 3 of the present application.

Problem to be Solved by the Invention

An object of the present invention is to provide a polymeric porous hollow fiber membrane for use as a membrane for treating a variety of aqueous fluids such as water, beverages, blood, etc., particularly for use as a membrane for treating a beverage containing polyphenol. This membrane has excellent fractionation performance and permeability and has a strength sufficient to induce no break or leakage, when assembled into a module or when in practical use. This membrane is suppressed in time degradation in its performance and characteristics, and has excellent membrane performance recoverability by washing and concurrently has a flavor-harmonizing effect, particularly in treatment of a beverage containing polyphenol.

Means for Solving the Problem

The present inventors have intensively studied to obtain a polymeric porous hollow fiber membrane which satisfies the essential properties required for a hollow fiber membrane for use in treatment of aqueous fluids, i.e., all of high levels of membrane performance (fractionation performance and permeability), strength, membrane performance sustainability and membrane performance recoverability. As a result, they have solved the above-described problem by providing a membrane having a specific structure. The inventors have concentrated their attentions on the structure, content of a hydrophilic polymer and polyphenol adsorption characteristics of a membrane, and have succeeded in the manufacturing of a membrane suitable for treatment of beverages containing polyphenol. The present invention is accomplished based on such finding.

The features of the present invention 1 are described below.

(1) A polymeric porous hollow fiber membrane containing a hydrophobic polymer and a hydrophilic polymer, characterized in that (a) skin layers are formed on the inner and outer surfaces of the membrane, respectively;

(b) the diameters of the pores in the inner surface are smaller than the diameters of the pores in the outer surface;

(c) the porosity of the membrane increases from the inner surface toward the outer surface, and then decreases from at least one portion having a maximum porosity, of the wall section of the membrane, toward the outer surface;

(d) a relationship of $2 [\%] \leq DR \leq 20 [\%]$ is satisfied, provided that the critical diameter of a particle to be removed, found by a test of passing fine particles, is $\phi max$ [μm]; the diameter of pores in the inner surface is dIS [μm]; and the proportion of pores with dIS exceeding $\phi max$ is DR [%].

(2) A polymeric porous hollow fiber membrane satisfying the following relationships, provided that the inner surface of the hollow fiber membrane is IS; a portion having a maximum porosity, of the section of the membrane, is CSmax; the pore diameters of the respective portions are dIS and dCSmax; and porosities of the respective portions are pIS and pCSmax:

(a) $0.001 [μm] \leq dIS \leq 1 [μm]$, (b) $0.1 [μm] \leq dCSmax \leq 10 [μm]$, (c) $5 [\%] \leq pIS \leq 30 [\%]$, and (d) $40 [\%] \leq pCSmax \leq 80 [\%]$.

(3) A polymeric porous hollow fiber membrane satisfying the following relationships, provided that the inner surface of the hollow fiber membrane is IS; the outer surface thereof is OS; eight portions into which the wall section of the hollow fiber membrane is equally divided in a direction from the inner surface to the outer surface are CS1, CS2, CS3, CS4, CS5, CS6, CS7 and CS8 in this order; the pore diameters of the respective portions are dIS, dOS, dCS1, dCS2, dCS3, dCS4, dCS5, dCS6, dCS7 and dCS8; and the porosities of the respective portions are pIS, pOS, pCS1, pCS2, pCS3, pCS4, pCS5, pCS6, pCS7 and pCS8:

(a) $dIS \leq dCS1 < dCS2 \leq dCS3 \geq dCS4 > dCS5 > dCS6 > dCS7 > dCS8 \geq dOS$, and (b) $pIS < pCS1 \leq pCS2 < pCS3 > pCS4 \geq pCS5 \geq pCS6 \geq pCS7 \geq pCS8 > pOS$.

(4) A polymeric porous hollow fiber membrane satisfying the following relationships, provided that the maximum pore diameter found at a bubble point is dBmax [μm]; and the permeability to pure water at 25° C. is F [L/(h·m²·bar)]:

(a) $(1/10{,}000) \times F \leq dBmax \leq (1/4{,}000) \times F$, and (b) $0.05 [μm] < dBmax \leq 1 [μm]$.

(5) A polymeric porous hollow fiber membrane satisfying the following relationships, provided that the content of a hydrophilic polymer in the entire hollow fiber membrane is Ca [% by weight]; the content of the hydrophilic polymer in the inner surface of the membrane is Ci [% by weight]; and the content of the hydrophilic polymer in the outer surface of the membrane is Co [% by weight]:

(a) $1 [\% \text{ by weight}] \leq Ca \leq 10 [\% \text{ by weight}]$, (b) $Ca \leq Ci$ and $Ca \leq Co$, and (c) $Co \leq Ci$.

(6) A polymeric porous hollow fiber membrane containing a polysulfone-based polymer as a hydrophobic polymer.

(7) A polymeric porous hollow fiber membrane containing polyvinyl pyrrolidone as a hydrophilic polymer.

The features of the present invention 2 are described below.

(8) A polymeric porous hollow fiber membrane containing a hydrophobic polymer and a hydrophilic polymer, and showing a polyphenol adsorption of from 50 to 500 mg per a surface area of 1 m² defined by the inner and outer surfaces of the membrane.

(9) The above polymeric porous hollow fiber membrane characterized in that (a) skin layers are formed on the inner surface and the outer surface of the membrane;

(b) the porosity of the membrane increases from the inner surface toward the outer surface, and then decreases from at least one portion having a maximum porosity, of the section of the membrane, toward the outer surface; and (c) the content of the hydrophilic polymer in the inner surface is from 10 to 40% by weight, and the content of the hydrophilic polymer in the entire hollow fiber membrane is from 0.5 to 10% by weight.

(10) A polymeric porous hollow fiber membrane for use in filtration of a beverage containing polyphenol.

(11) A polymeric porous hollow fiber membrane satisfying the following relationships, provided that the thickness of the membrane is D [μm], and the permeability to pure water at 25° C. is F [L/(h·m²·bar)]:
(a) 40≤D≤400, and
(b) 400≤F≤4,000.

(12) A polymeric porous hollow fiber membrane satisfying the following relationships, provided that the inner surface of the membrane is IS; a portion having a maximum porosity, of the wall section of the membrane, is CSmax; the pore diameters of the respective portions are dIS and dCSmax; and the porosities of the respective portions are pIS and pCSmax:
(a) 0.01 [μm]≤dIS≤1 [μm],
(b) 0.1 [μm]≤dCSmax≤10 [μm],
(c) 5 [%]≤pIS≤30 [%], and
(d) 40 [%]≤pCSmax≤80 [%].

(13) A polymeric porous hollow fiber membrane containing substantially no insoluble component.

(14) A polymeric porous hollow fiber membrane containing polyvinyl pyrrolidone as a hydrophilic polymer.

(15) A polymeric porous hollow fiber membrane containing a polysulfone-based polymer as a hydrophobic polymer.

(16) A polymeric porous hollow fiber membrane containing a hydrophobic polymer which contains a phenolic hydroxyl group.

In the following description, when the present invention 1 and the present invention 2 are referred to, the features of the respective inventions are indicated. When the present invention 1 and the present invention 2 are not referred to, common features between the present invention 1 and the present invention 2 are indicated.

Effect of the Invention

The polymeric porous hollow fiber membranes of the present invention can be used as membranes for treating a variety of aqueous fluids such as water, beverages, blood, etc., and are excellent in membrane performance sustainability and membrane performance recoverability by washing. Thus, the polymeric porous hollow fiber membranes of the present invention can be industrially used as membranes for treating water and beverages. The polymeric porous hollow fiber membranes of the present invention are optimized in interaction with polyphenol, and thus are possible to harmonize the flavors of beverages containing polyphenol, and therefore can be preferably used as membranes for treating polyphenol-containing beverages.

BEST MODES FOR CARRYING OUT THE INVENTION

Hereinafter, the present invention will be described in detail.

In the present invention, preferably, a polymeric porous hollow fiber membrane comprises a hydrophobic polymer and a hydrophilic polymer. Examples of the hydrophilic polymer include polyethylene glycol, polyvinyl alcohol, polyvinyl pyrrolidone (hereinafter referred to as PVP), and polymeric carbohydrates such as carboxymethyl cellulose and starch, among which PVP is preferred because of its miscibility with polysulfone, its proved utility in aqueous fluid-treating membranes, and its interaction with polyphenol. Each of these hydrophilic polymers may be used alone, or at least two selected therefrom may be used as a mixture. The weight-average molecular weight of a preferably usable PVP is from 10,000 to 1,500,000. Specifically, commercially available products of PVP from BASF, of which the molecular weights are 9,000 (K17), 45,000 (K30), 450,000 (K60), 900,000 (K80) and 1,200,000 (K90), are preferably used.

In the present invention, examples of the hydrophobic polymer include polyester, polycarbonate, polyurethane, polyamide, polysulfone (hereinafter referred to as PSf), polyethersulfone (hereinafter referred to as PES), poly(methyl methacrylate), polypropylene, polyethylene, polyvinylidene fluoride, etc. Among those, the polysulfone-based polymers such as PSf and PES each having a repeating unit represented by the formula [1] or [2] are advantageous to obtain membranes having high water permeability. The polysulfone-based polymer herein referred to may contain a functional group or a substituent such as an alkyl group, in which a hydrogen atom of the hydrocarbon skeleton may be substituted by other atom or substitutent such as a halogen atom. Each of these polymers may be used alone, or at least two selected therefrom may be used as a mixture.

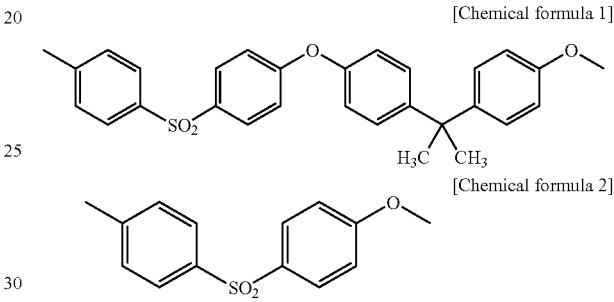

[Chemical formula 1]

[Chemical formula 2]

A hydrophobic polymer to be used in the present invention 2, preferably, contains a phenolic hydroxyl group. An interaction between the phenolic hydroxyl group and a hydrophilic polymer induces a certain anchoring effect to thereby optimize an interaction between the resultant hollow fiber membrane and polyphnenol, although its detailed mechanism has not been elucidated. Specifically, the use of a hydrophobic polymer which has a structure of the above-described polysulfone-based polymer and has a hydroxyphenyl group at its end is preferable.

In the present invention, the features of the polymeric porous hollow fiber membrane rests in that the hollow fiber membrane has skin layers on the inner and outer surfaces, respectively, and in that the porosity increases from the inner surface toward the outer surface, and then decreases from at least one portion having a maximum porosity, of the wall section of the membrane, toward the outer surface. In the present invention, the pore diameter and the porosity are determined as follows: the electron microscopic photograph of a dried membrane is fetched into a computer to be analyzed by an image analysis system software and numerically expressed. Specifically, the porosity is determined by the equation [3], and the pore diameter (average pore diameter), by the equations [4] and [5], from the total area of the image fetched into the image analysis system software, the sum of the areas of the pores and the number of the pores:

$$\text{Porosity}[\%] 100 \times (\text{the sum of the areas of the pores/the total area of the fetched image}) \quad [3]$$

$$\text{Area of a pore (average pore area) } [\mu m^2] = \text{the sum of the areas of the pores/the number of the pores}) \quad [4]$$

$$\text{Pore diameter (average pore diameter) } [\mu m] = (\text{the average pore area}/\pi)^{1/2} \quad [5]$$

There is no limit in selection of the shape of the pores in the present invention. However, as can be understood from the equation [3], the pore diameter is calculated from the area of the pore approximating a circle. If the pore is in the shape of a slit or a spindle or in an irregular shape, which markedly differs from a circle, its actual value largely differs from the calculated value. Therefore, preferably, the shape of the pores is elliptic or circular.

In the present invention, the features that the hollow fiber membrane has skin layers on its inner and outer surfaces and that the pore diameter in the inner surface is smaller than the pore diameter in the outer surface indicate that the inner surface and the outer surface of the hollow fiber membrane define the fractionation performance and permeability of the hollow fiber membrane. When an aqueous fluid is treated through crossflow filtration by perfusing the inside of the hollow fiber membrane with the aqueous fluid, a shear force by the fluid is caused in the inner surface of the hollow fiber membrane, so that the accumulation of a substance to be removed, on the surface can be avoided. In this connection, the presence of the skin layer on the surface of the membrane enhances this effect. When the portion on the rear side of the skin layer is a sponge-like support layer having pores with larger diameters and a higher porosity, advantageously, the resistance of the fluid becomes lower so that the hollow fiber membrane is more likely to have higher permeability. In other words, it is preferable for the hollow fiber membrane to have a structure in which the inner surface is minute, and the inner portion, coarse. When a hollow fiber membrane has a reverse structure in which the inner surface is coarse, and the inner portion, minute, undesirably, clogging of the thicker portion of the membrane due to a substance to be removed tends to proceed. However, there is an inevitable distribution of pore diameters, and therefore, the substance to be removed is not trapped and thus unavoidably passes through. Therefore, a membrane of which the fractionation performance is determined only by the thin skin layer on its inner surface becomes dull in fractionation performance, or the productivity of a hollow fiber membrane is sacrificed in order to obtain sharp fractionation performance.

In the present invention, the polymeric porous hollow fiber membrane has skin layers on its inner and outer surfaces, and therefore, the substance to be removed, which has passed through the skin layer on the inner surface, is likely to be trapped by the skin layer on the outer surface. Therefore, the hollow fiber membrane can have sharper fractionation performance.

In this regard, preferably, a portion of the membrane wall portion, at which the porosity becomes maximum, is present at a position which is slightly on the side of the inner surface from the center of the membrane wall. In such a structure, the slope of the pore diameter distribution from the surface toward the inner portion becomes larger in the proximity of the inner surface, and the fractionation-determining layer becomes thinner, which is effective to improve the permeability of the membrane. On the other hand, the slope of the pore diameter distribution from the inner portion toward the surface direction becomes smaller in the proximity of the outer layer, and thus, the effect of the depth filtration contributes to improvement of fractionation.

In the present invention 1, the inner surface of the hollow fiber membrane is represented by IS, and the outer surface thereof is represented by OS; and the section of the hollow fiber membrane is equally divided into eight portions from the inner surface to the outer surface, and such eight portions are represented by CS1, CS2, CS3, CS4, CS5, CS6, CS7 and CS8 in this order, starting from the inner surface; the pore diameters of the respective portions are represented by dIS, dOS, dCS1, dCS2, dCS3, dCS4, dCS5, dCS6, dCS7 and dCS8; and the porosities of the respective portions are represented by pIS, pOS, pCS1, pCS2, pCS3, pCS4, pCS5, pCS6, pCS7 and pCS8. Then, it is preferable to satisfy the following relationships:

(a)   $dIS \leq dCS1 < dCS2 \leq dCS3 \geq dCS4 > dCS5 > dCS6 > dCS7 > dCS8 \geq dOS$, and (b)   $pIS < pCS1 \leq pCS2 < pCS3 > pCS4 \geq pCS5 \geq pCS6 \geq pCS7 \geq pCS8 > pOS$.

The polymeric porous hollow fiber membrane of the present invention is more likely to sustain its membrane performance, since the membrane has a skin layer on its inner surface to thereby exert the effect of a shear force by crossflow filtration at its inner surface. Further, the hollow fiber membrane has the minute-coarse-minute structure in which the inner surface has a skin layer thereon, and therefore, a substance to be removed is easy to remove during backwash. Therefore, the hollow fiber membrane has excellent recoverability. It is considered that the substance to be removed is trapped by the skin layer on the outer surface. However, a washing liquid flows in a direction from the pores with smaller diameters to the pores with larger diameters during backwash, and thus, the trapped substance is easy to remove. While the detailed mechanism is unknown, the minute-coarse-minute structure of the hollow fiber membrane possibly causes the washing liquid to flow inside the membrane wall non-linearly and at random, so that the washing effect is supposed to be enhanced.

In the present invention 1, one of the significant features of the polymeric porous hollow fiber membrane is to satisfy the relationship of $2 [\%] \leq DR \leq 20 [\%]$, provided that the critical diameter of a particle to be removed, found by a fine particle-passing test, is $\phi max$ [μm]; the pore diameter of the inner surface is dIS [μm]; and the ratio of pores with dIS exceeding $\phi max$ is DR [%].

As has been described above, both the surface layer effect because of the pore diameter of the membrane surface and the depth effect because of the thick portion of the membrane contribute to the removal of the substance by membrane filtration. The features of the present invention are obtained when the contribution of the surface layer effect to the fractionation performance is relatively large. Since the depth effect is to separate a substance due to the thickness of the membrane wall, a separation mechanism depending on this effect is likely to clog the inner portion of the membrane due to the substance to be removed. This means that the membrane performance tends to degrade with time, which is undesirable behavior. In separation depending on the surface layer effect, the substance stays on the membrane surface and thus is easy to be removed by backwash. In other words, when a hollow fiber membrane is so designed as to have a separation mechanism which dominantly depends on the surface layer effect rather than the depth effect, such a hollow fiber membrane can have excellent membrane performance sustainability and excellent membrane performance recoverability. In the present invention, the relationship of $2[\%] \leq DR \leq 20 [\%]$ is satisfied, provided that the critical diameter of a particle to be removed, found by the fine particle-passing test, is $\phi max$ [μm]; the pore diameter of the inner surface is dIS [μm]; and the ratio of pores with dIS exceeding $\phi max$ is DR [%]. By satisfying this relationship, a polymeric porous hollow fiber membrane excellent in membrane performance sustainability and membrane performance recoverability can be obtained. When DR is too large, contribution of the depth filtration becomes too large, which leads to degradation of the membrane performance sustainability and membrane performance recoverability. In addition, there is a certain unavoidable distribution of the pores on the membrane surface. To extremely narrow this distribution induces a remarkable decrease in productivity. Therefore, DR is preferably 2% or more. From this viewpoint, DR is more preferably 2% or more and 15% or less ($2[\%] \leq DR \leq 15 [\%]$), still more preferably 3% or more and 10% or less ($3 [\%] \leq DR \leq 10 [\%]$).

Again, in the present invention 1, preferably, the polymeric porous hollow fiber membrane satisfies the following relationships, provided that the maximum pore diameter, found by a bubble point, is dBmax [μm], and the pure water permeability at 25° C. is F [L/(h·m²·bar)]:

(a) $(1/10,000) \times F \leq dBmax \leq (1/4,000) \times F$, and
(b) $0.05 [\mu m] \leq dBmax \leq 1 [\mu m]$.

The diameter and number of the pores are considered to have connections so as to achieve a certain water permeability. When the number of pores is largely increased to improve water permeability, the strength of such a membrane lowers, which leads to higher possibility to cause leakage or break during the use of such a hollow fiber membrane. When the diameter of the pores is largely increased, the substance to be removed is more likely to leak out. When the maximum diameter dmax is too small, the pores must be increased in number so as to achieve a high pure water permeability F, which leads to poor membrane strength. When the dmax is too large, the pore diameter becomes larger, which leads to poor separation performance. When the maximum diameter dmax satisfies the relationship of $(1/10,000) \times F \leq dmax \leq (1/4,000) \times F$, the hollow fiber membrane can have sufficient strength and separation performance.

In order for a hollow fiber membrane to have stable permeability and stable separation performance over a long period of time, it is necessary to inhibit non-specific adsorption of a substance which is derived from a fluid to be treated, onto the membrane. When an aqueous fluid is treated with a membrane, such non-specific adsorption of the substance onto the membrane can be suppressed by increasing the hydrophilicity of the material for the membrane. However, such an increased hydrophilicity is likely to lead to elution of the hydrophilic polymer. Therefore, preferably, the hydrophilic polymer is introduced in an effective amount as little as possible.

In the present invention 1, it is preferable to satisfy the following relationships, provided that the content of the hydrophilic polymer in a whole of the hollow fiber membrane is Ca [% by weight]; the content of the hydrophilic polymer in the inner surface of the membrane is Ci [% by weight]; and the content of the hydrophilic polymer in the outer surface of the membrane is Co [% by weight]:

(a) 1 [% by weight] $\leq$ Ca $\leq$ 10 [% by weight],
(b) Ca $\leq$ Ci and Ca $\leq$ Co, and
(c) Co $\leq$ Ci.

When these relationships are satisfied, desirably, a necessary and sufficient amount of the hydrophilic polymer is present in a concentrated form on the surface of the membrane, particularly on the inner surface thereof which determines the separation performance of the membrane.

In the present invention 2, the hydrophilic polymer interacts with polyphenol to thereby adsorb the polyphenol. Further, balance between hydrophobicity and hydrophilicity gives some influence on adsorption of polyphenol. In the present invention, the content of the hydrophilic polymer in the inner surface of the hollow fiber membrane is preferably from 10 to 40% by weight, and the content of the hydrophilic polymer in a whole of the hollow fiber membrane is preferably from 0.5 to 10% by weight. When these relationship are satisfied, desirably, the hydrophilic polymer in an amount necessary and sufficient to impart hydrophilicity and to interact with polyphenol are present in a concentrated form in the surface of the membrane mainly in contact with a fluid to be treated, particularly in the inner surface of the membrane which determines the separation performance of the membrane. The content of the hydrophilic polymer in the inner surface of the hollow fiber membrane is preferably from 20 to 30% by weight, more preferably from 25 to 30% by weight. The content of the hydrophilic polymer in a whole of the hollow fiber membrane is preferably from 1 to 5% by weight, more preferably from 1 to 3% by weight, still more preferably from 1.5 to 2.5% by weight.

In the present invention 2, preferably, the adsorption of polyphenol per a surface area of 1 m² defined by both the inner surface and the outer surface of the membrane is from 50 to 500 mg. When this adsorption is satisfied, the interaction between the membrane and polyphenol is optimized to thereby optimize the effect of improving the flavor of a beverage. When the adsorption of polyphenol onto the membrane is too large, the polyphenol of a polyphenol-containing beverage is excessively adsorbed when filtered through the membrane, with the result that the beverage loses its flavor. When the adsorption of polyphenol onto the membrane is too small, the polyphenol of the beverage is not sufficiently adsorbed, and the beverage has unpleasant tastes and cloudiness left to remain therein. Therefore, the adsorption of polyphenol onto the membrane is preferably from 100 to 400 mg, more preferably from 100 to 300 mg, still more preferably from 100 to 200 mg.

In this regard, the polyphenol adsorbed onto the membrane is usually washed off with an agent (under an alkaline condition) from the membrane in the course of the filtration of the beverage. Therefore, the polymeric porous hollow fiber membrane of the present invention is expected to sustain the effect of harmonizing the flavors of beverages over a long period of time.

In this regard, polyphenol is the generic name of plant components each having a plurality of phenolic hydroxyl groups in the molecule, which are components of pigments produced by photosynthesis of plant, or components of bitter taste and astringent taste of plant. There are 5,000 or more kinds of polyphenolic compounds. In the present invention, polyphenol is meant to include flavonoid such as catechin, anthocyanin, flavone, isoflavone, flavanone and quercetin; phenolic acids such as chlorgenic acid; and substances generally called polyphenol, such as phenylcarboxylic acid, ellagic acid, lignin, curcumin, coumarin and rutin. The adsorption of polyphenol referred to in the present invention may be the absorption of a specific compound called polyphenol or the adsorption of a mixture of a plurality of compounds.

The diameter of the polymeric porous hollow fiber membrane of the present invention may be appropriately selected in accordance with an end use thereof, and thus is not limited. However, the inner diameter of the membrane is preferably from 100 to 1,500 μm, more preferably from 130 to 1,300 μm. When the inner diameter of the membrane is too small, a component of a fluid to be treated is likely to clog the inner hollow portion of the membrane. When the inner diameter of the membrane is too large, the hollow fiber membrane is liable to crush or warp.

In the polymeric porous hollow fiber membrane of the present invention 2, preferably, the thickness of the membrane and the pure water permeability of the membrane are selected within specified ranges, respectively. When the membrane has a large thickness and low permeability, the time during which the wall portion of the membrane is contacting a fluid to be treated, while the fluid is passing through the membrane, becomes longer. When the membrane, on the contrary, has a small thickness and high permeability, the above-described contact time becomes shorter. When this contact time is long, the polyphenol of a polyphenol-containing beverage is excessively adsorbed onto the membrane in the filtration of the beverage, so that the flavor of the beverage may be lost. On the contrary, when the contact time is short, the absorption of polyphenol is too small, so that the beverage may have unpleasant tastes and cloudiness left to remain therein.

From these viewpoints, the thickness of the membrane is preferably from 40 to 400 μm, and the pure water permeability of the membrane at 25° C. is preferably from 400 to 4,000 L/(h·m²·bar). When the thickness of the hollow fiber membrane is too small, the membrane is liable to crush or warp. When the thickness of the hollow fiber membrane is too large, the resistance of a treating fluid which passes through the wall of the membrane becomes larger, with the result that the permeability of the membrane may becomes lower.

The diameter of the pores in the inner surface of the polymeric porous hollow fiber membrane of the present invention is preferably from 0.001 to 1 μm, more preferably from 0.01 to 1 μm. A pore diameter smaller than the lower limit of this range is not preferable, because the permeability of the membrane becomes lower. A pore diameter larger than the upper limit of this range is not preferable, because the strength of the membrane becomes lower. The porosity of the inner surface of the membrane is preferably from 5 to 30%, more preferably from 7 to 25%. When the porosity is too small, the permeability of the membrane may be lower. When the porosity is too large, the strength of the membrane may be lower.

One of the features of the polymeric porous hollow fiber membrane of the present invention rests in that the wall portion of the membrane has a portion at which the porosity becomes maximum. The diameter of the pores at this portion having the maximum porosity is larger than any of the diameters of the pores in the inner surface and the outer surface of the membrane, and it is preferably from 0.1 to 10 μm, more preferably from 0.2 to 8 μm. When the diameter of pores at this portion having the maximum porosity is too small, the slope of the membrane structure becomes gentle, which may lead to decreases in the membrane performance, membrane performance sustainability and membrane performance recoverability. When the diameter of pores at this portion having the maximum porosity is too large, the strength of the membrane may be lower.

The maximum porosity of this portion of the membrane wall is larger than any of the porosities of the inner surface and the outer surface of the membrane, and is preferably from 40 to 80%, more preferably from 45 to 70%. When the maximum porosity of this portion is too small, the slope of the membrane structure becomes gentle, which may lead to decreases in the membrane performance, membrane performance sustainability and membrane performance recoverability. When the maximum porosity of this portion is too large, the strength of the membrane may be lower.

While the diameter of the pores in the outer surface of the membrane is not limited, it is preferably from 0.02 to 2 μm. When this pore diameter is too small, the permeability of the membrane may be lower. When this pore diameter is too large, the strength of the membrane may be lower.

While the porosity of the outer surface of the membrane is not limited, it is preferably from 5 to 30%, more preferably from 7 to 25%. When this porosity is too small, the permeability of the membrane may be lower, and the sticking of adjacent hollow fiber membranes is liable to occur. When this porosity is too large, the strength of the membrane may be lower.

In this connection, the porosity and the pore diameter herein referred to are the porosity found by the above-described equation [3] and the average pore diameter found by the above-described equations [4] and [5], respectively.

A hydrophilic polymer which is partially modified in its structure by crosslinking or other treatment is considered to show a subtly different behavior from the properties intrinsic to the hydrophilic polymer. It is preferable not to substantially insolubilize a hydrophilic polymer contained in the polymeric porous hollow fiber membrane of the present invention, in order to ensure the membrane performance during the treatment of an aqueous fluid and to ensure the membrane performance sustainability. Specifically, the content of the insoluble component in the entire membrane is less than 2% by weight. The content of the insoluble component herein referred to means the proportion of a component which is not dissolved and is left to remain, when a hollow fiber membrane shaped and dried is dissolved in a solvent used in a membrane-forming solution. Specifically, this content means a content calculated by the following method. That is, a hollow fiber membrane (10 g) is dissolved in dimethyl formamide (100 ml) to form a solution, and this solution is subjected to centrifugal separation at 1,500 rpm for 10 minutes, and the resulting supernatant is removed. Dimethyl formamide (100 ml) is again added to the residual insoluble solid, and the mixture is stirred and is then subjected to centrifugal separation under the same condition, and the resulting supernatant is removed. Dimethyl formamide (100 ml) is again added to the residue, and the mixture is stirred and is similarly subjected to centrifugal separation, and the resulting supernatant is removed. The residual solid is vaporized and dried, and the content of the insoluble component is determined from the amount of the dried solid.

The method for shaping the basic portion of the polymeric porous hollow fiber membrane of the present invention is not limited. An example of the method is described below: a hydrophobic polymer, a hydrophilic polymer, a solvent and a non-solvent are mixed and dissolved, and the resulting solution is defoamed for use as a membrane-forming solution; this membrane-forming solution is discharged together with a inner liquid concurrently from each of the annular portion and the center portion of a double tube nozzle, and the resulting semi-solid filament is allowed to pass through an aeration feeding area (or an air gap area) and is then introduced into a coagulating bath to form a hollow fiber membrane (the dry-and-wet type spinning method); and the hollow fiber membrane is washed with water and is then wound up and dried.

The solvent to be used in the membrane-forming solution may be any one that can be a good solvent for the hydrophobic polymer and the hydrophilic polymer to be used. Examples of the solvent include N-methyl-2-pyrrolidone (hereinafter referred to as NMP), N,N-dimethylformamide (hereinafter referred to as DMF), N,N,-dimethylacetoamide (hereinafter referred to as DMAc), dimethyl sulfoxide (hereinafter referred to as DMSO), ε-caprolactam, etc. When a polysulfone-based polymer such as PSf, PES or the like is used as the hydrophobic polymer, an amide type aprotic solvent such as NMP, DMF or DMAc is preferably used, and NMP is particularly preferable. The amide type solvent to be used in the present invention indicates a solvent having an amide bond of N—C(=O) in its structure, and the aprotic solvent means a solvent which has no hydrogen atom directly bonded to a hetero atom other than carbon atoms in its structure.

The membrane-forming solution may contain a non-solvent to the polymer. Examples of the non-solvent to be used include ethylene glycol, propylene glycol, diethylene glycol (hereinafter referred to as DEG), triethylene glycol (hereinafter referred to as TEG), polyethylene glycol (hereinafter referred to as PEG), glycerin, water, etc. When a polysulfone-based polymer such as PSf or PES is used as the hydrophobic polymer, and PVP, as the hydrophilic polymer, an ether polyol such as DEG, TEG or PEG is preferably used, among which TEG is particularly preferable. The ether polyol to be used in the present invention is a substance having at least one ether bond and at least two hydroxyl groups in its structure.

While the detailed mechanism is unknown, the use of the membrane-forming solution prepared using any of these solvents and any of these non-solvents is effective to control the phase separation (or coagulation) of the solution during the spinning step, and thus is considered to be advantageous for the formation of a membrane structure preferable for the present invention. To control the phase separation of the membrane, the composition of the inner liquid and the composition of a liquid in the coagulating bath (or an external coagulating liquid) described later are also important.

The concentration of the hydrophobic polymer in the membrane-forming solution is not limited, in so far as the membrane can be formed of such a solution. The concentration of the hydrophobic polymer is preferably from 10 to 35% by weight, more preferably from 10 to 30% by weight. Preferably, the membrane-forming solution has a lower concentration of the hydrophobic polymer, in order for the membrane to have a higher permeability. When the hydrophobic polymer concentration is too low, the strength of the membrane tends to lower, and the fractionation performance of the membrane tends to degrade. Accordingly, the hydrophobic polymer concentration is preferably 15% by weight or more.

The amount of the hydrophilic polymer to be added is not limited, in so far as the amount thereof is sufficient to impart hydrophilicity to the hollow fiber membrane and to inhibit non-specific adsorption during the treatment of an aqueous fluid. However, the ratio of the hydrophilic polymer to the hydrophobic polymer is preferably from 10 to 30% by weight, more preferably from 10 to 20% by weight. When the addition amount of the hydrophilic polymer is too small, the hydrophilicity-imparting effect to the membrane is insufficient, and the membrane performance sustainability is likely to degrade. When the addition amount of the hydrophilic polymer is too large, the hydrophilicity-imparting effect to the membrane is saturated, resulting in poor efficiency, and the phase separation (or solidification) of the membrane-forming solution tends to excessively proceed, which is disadvantageous to form the preferable membrane structure of the present invention.

The ratio of the solvent to the non-solvent in the membrane-forming solution is an important factor for the control of the phase separation (or solidification) of the membrane-forming solution during the spinning step. Specifically, the weight ratio of the content of the solvent to the content of the non-solvent is preferably from 30/70 to 70/30, more preferably from 35/65 to 60/40, still more preferably from 35/65 to 55/45. When the content of the solvent is too small, the solidification of the solution tends to proceed, and the structure of the membrane becomes too minute, resulting in poor permeability. When the content of the solvent is too large, the phase separation of the solution is excessively suppressed, and formation of pores with large diameters is facilitated, which results in degradation of the fractionation performance and the strength of the membrane.

The membrane-forming solution is prepared by mixing and stirring the hydrophobic polymer, the hydrophilic polymer, the solvent and the non-solvent. In this preparation, the dissolution can be efficiently carried out by heating at an appropriate temperature. However, excessive heating is likely to induce the decomposition of the polymers. Thus, the dissolution is carried out preferably at a temperature of from 30 to 100° C., more preferably at a temperature of from 40 to 80° C. When PVP is used as the hydrophilic polymer, preferably, the dissolution of the spinning solution is carried out under an atmosphere of an inert gas, since PVP is oxidized and decomposed under the influence of oxygen in an air. As the inert gas, nitrogen, argon or the like is used, among which nitrogen is preferable. In the dissolution, the concentration of the residual oxygen in a dissolution tank is preferably 3% or less. When the pressure for charging nitrogen is increased, the time required for the dissolution can be reduced. However, the pressure for charging nitrogen is preferably from an atmospheric pressure to 2 kgf/cm$^2$, in view of high cost for an apparatus capable of withstanding a high pressure and safety in operation.

In the formation of the hollow fiber membrane, it is preferable to use the membrane-forming solution free from foreign matters, so as to avoid defects in the structure of the hollow fiber membrane because of the inclusion of the foreign matters into the membrane. In concrete, materials containing less foreign matters are used for the membrane-forming solution, and the membrane-forming solution is filtered to thereby decrease the amount of the foreign matters. In the present invention, a filter having pores with diameters smaller than the thickness of the hollow fiber membrane is used to filter the membrane-forming solution, and then, the membrane-forming solution is discharged from a nozzle. Specifically, a homogeneously dissolved spinning solution is allowed to pass through a sintered filter having pores with diameters of from 10 to 50 μm provided between the dissolution tank and the nozzle. It is sufficient to carry out at least one filtration treatment. When the filtration treatment is carried out in several stages, the diameters of the pores of filters are gradually decreased toward a filter in the later stage. This is preferable for filtration efficiency and for prolongation of the lifetime of the filters. The diameter of the pores of the filter is preferably from 10 to 45 μm, more preferably from 10 to 40 μm. When the diameter of the pores of the filter is too small, a back pressure tends to increase, and the productivity tends to lower.

It is also effective to eliminate bubbles in the membrane-forming solution, in order to obtain the hollow fiber membrane free from any defect. It is effective to defoam the membrane-forming solution in order to prevent the inclusion of bubbles into the solution. The membrane-forming solution may be defoamed in a still state or under reduced pressure, in accordance with the viscosity of the membrane-forming solution. In this case, the dissolution tank is decompressed from a normal pressure to a pressure of from −100 to −750 mmHg, and is then sealed and left to stand still for 30 to 180 minutes. This operation is repeated several times to defoam the membrane-forming solution. When the decompression degree is too low, the times of defoaming must be increased in number, which requires a longer time for treatment. When the decompression degree is too high, cost for increasing the sealing degree of the system becomes higher. The total treating time is preferably from 5 minutes to 5 hours. When the treating time is too long, the components of the membrane-forming solution may be decomposed and degraded under the influence of decompression. When the treating time is too short, the defoaming effect may be insufficient.

As the composition of the inner liquid to be used to form the hollow fiber membrane, it is preferable to use a mixture of water with the same solvent and non-solvent as those contained in the membrane-forming solution. The ratio of the solvent to the non-solvent in the inner liquid is preferably the same as the ratio of the solvent to the non-solvent in the membrane-forming solution. The solvent and the non-solvent which are the same ones as those used in the membrane-forming solution are mixed in the same ratio as that for the membrane-forming solution, and the mixture is admixed and diluted with water for use as the inner liquid. The content of water in the inner liquid is preferably from 10 to 40% by weight, more preferably from 15 to 30% by weight. When the content of water is too large, the solidification of the membrane-forming solution rapidly proceeds, so that the structure of the membrane becomes too minute, which may lead to poor permeability. When the content of water is too small, the phase separation of the membrane-forming solution is excessively suppressed to facilitate the formation of pores with larger diameters, which may induce degradation of the fractionation performance and the strength of the resultant membrane.

As the composition of the external solidifying liquid, it is preferable to use a mixture of water with the same solvent and non-solvent as those contained in the membrane-forming solution. The ratio of the solvent to the non-solvent in the solidifying liquid is preferably the same as the ratio of the solvent to the non-solvent in the membrane-forming solution. The solvent and the non-solvent which are the same ones as those used in the membrane-forming solution are mixed in the same ratio as that for the membrane-forming solution, and the resulting mixture is admixed and diluted with water for use as the external solidifying liquid. The content of water in the solidifying liquid is preferably from 30 to 85% by weight, more preferably from 40 to 80% by weight. When the content of water is too large, the coagulation of the membrane-forming solution rapidly proceeds, so that the structure of the membrane becomes too minute, which may lead to poor permeability. When the content of water is too small, the phase separation of the membrane-forming solution is excessively suppressed to facilitate the formation of pores with larger diameters, which may induce degradation of the fractionation performance and the strength of the resultant membrane. When the temperature of the external solidifying liquid is too low, the solidification of the membrane-forming solution is facilitated, so that the structure of the membrane becomes too minute, which results in poor permeability. When this temperature is too high, the phase separation of the membrane-forming solution is excessively suppressed to facilitate the formation of pores with larger diameters, which may induce degradation of the fractionation performance and the strength of the resultant membrane. Therefore, the temperature of the external solidifying liquid is preferably from 30 to 80° C., more preferably from 40 to 70° C.

In the present invention, one of the factors to control the membrane structure is a temperature of a nozzle. Too low a nozzle temperature facilitates the solidification of the membrane-forming solution, which causes the membrane to have too minute a structure and thus to have low permeability. Too high a nozzle temperature excessively suppresses the phase separation of the membrane-forming solution, which causes the membrane to have pores with larger diameters, which may lead to degradation of the fractionation performance and strength of the membrane. Accordingly, the nozzle temperature is preferably from 30 to 90° C., more preferably from 40 to 80° C.

As a preferable method for manufacturing the polymeric porous hollow fiber membrane of the present invention, the dry-and-wet type spinning method is exemplified in which the membrane-forming solution discharged together with the inner liquid from a double tube nozzle is introduced into the solidifying bath filled with the external solidifying liquid, through the air gap area, to thereby shape the hollow fiber membrane. In this method, the time during which the membrane-forming solution discharged from the nozzle is resident at the air gap area is one of the possible factors to control the membrane structure. When the residence time is too short, the membrane-forming solution, in which growth of agglomerated particles due to the phase separation of the solution at the air gap area is suppressed, is quenched by the external solidifying liquid, so that the outer surface of the membrane becomes too minute, which results in lower permeability. The resultant hollow fiber membranes are liable to stick to one another because of such minute outer layers. When the residence time is too long, the membrane is more likely to have pores with larger diameters and thus is likely to be degraded in fractionation performance and strength. The residence time of the membrane-forming solution at the air gap area is preferably from 0.05 to 4 seconds, more preferably from 0.1 to 3 seconds.

The hollow fiber membrane, after having passed through the air gap area in a relatively short passing time, is introduced into the coagulating bath to contact the external coagulating liquid having a relatively mild coagulating property, meanwhile the hollow fiber membrane is being coagulated by the inner liquid and is being inhibited from its coagulation from external to a certain degree. In other words, the hollow fiber membrane which has just entered the coagulating bath is in an "alive" state and thus does not have a perfectly defined structure. The "alive" hollow fiber membrane is perfectly coagulated in the coagulating bath and is defined in its structure, and is then removed from the coagulating bath. As described above, the coagulating property of the external coagulating liquid is relatively mild, and thus, a sufficient residence time is needed for the hollow fiber membrane to be perfectly coagulated in the coagulating bath. Specifically, the residence time in the coagulating bath is preferably from 5 to 20 seconds, more preferably from 10 to 20 seconds. When the residence time in the coagulating bath is too short, the coagulation of the hollow fiber membrane tends to be insufficient. When the residence time in the coagulating bath is too long, the membrane-forming rate tends to lower, or a larger coagulating bath may be needed.

The significant feature of the polymeric porous hollow fiber membrane of the present invention is that the hollow fiber membrane has skin layers on its inner and outer surfaces, wherein the inner surface has pores with diameters smaller than the diameters of the pores of the outer surface, and wherein the porosity of the membrane increases from the inner surface toward the outer surface and then decreases from at least one portion having a maximum porosity, of the section of the membrane, toward the outer surface. In order for the hollow fiber to have such a structure, preferably, the above-described method is employed to manufacture the hollow fiber membrane, using the above-described membrane-forming solution under the above-described spinning conditions. In order for the hollow fiber membrane to have a minute-coarse-minute asymmetric structure from its inner surface toward its outer surface, it is needed to control the coagulation of the membrane from both the inner surface and the outer surface toward the inner portion of the membrane wall, while harmonizing and antagonizing the coagulation of the membrane from its inner surface (the phase separation and coagulation of the membrane mainly by the inner liquid) and the coagulation of the membrane from its outer surface (the phase separation and coagulation of the membrane mainly by the air gap area and the external coagulating liquid). The effective controlling conditions therefor are the composition of the inner liquid, the composition of the external coagulating liquid and the temperature thereof, the residence time in the air gap area and the residence time in the coagulating bath, as described above. The characteristic membrane structure of the present invention can be obtained by specifying these conditions within the above-described ranges.

To obtain the polymeric porous hollow fiber membrane of the present invention, subtle control of the coagulations proceeding from both the inner and outer surfaces of the membrane is needed. In this control, careful attentions should be paid to bending of the hollow fiber membrane in the coagulating bath. In the dry-wet type spinning method, generally, a membrane-forming solution is discharged in a gravitational direction from a nozzle facing downward, and is introduced into a coagulating bath through an air gap area; the feeding direction of the resulting membrane is changed to an upward direction in the coagulating bath to remove the membrane from the coagulating bath; and the membrane is washed in a water-washing bath and is then wound up. The polymeric porous hollow fiber membrane of the present invention is in an "alive" state in which the structure of the membrane is not perfectly defined just after the membrane has entered the coagulating bath, and therefore, the structure of the membrane is likely to be damaged or destructed, when the feeding direction of the membrane is rapidly changed in the coagulating bath. Specifically, the radius of curvature for changing the feeding direction is from 20 to 300 mm, preferably from 30 to 200 mm, more preferably from 40 to 100 mm, still more preferably from 40 to 70 mm. It is also preferable to use a multipoint guide to gradually change the feeding direction of the hollow fiber membrane at a plural number of points.

In the manufacturing of the polymeric porous hollow fiber membrane of the present invention, it is preferable not to substantially draw the hollow fiber membrane before the structure of the hollow fiber membrane is perfectly fixed. The wording of "not to substantially draw" means that the speeds of rollers for use in the spinning step are controlled so that a filament of the spinning solution discharged from the nozzle is not loosen or does not have an excessive tension. The ratio of the linear discharge speed to the speed of the first roller in the coagulating bath (the draft ratio) is preferably from 0.7 to 1.8. When the draft ratio is less than 0.7, the hollow fiber membrane being fed tends to loose, which is likely to lead to poor productivity. Therefore, the draft ratio is more preferably 0.8 or more, still more preferably 0.9 or more, far still more preferably 0.95 or more. When the draft ratio exceeds 1.8, the skin layers of the hollow fiber membrane are torn, and the structure of the membrane may be destructed. Therefore, the draft ratio is more preferably 1.7 or less, still more preferably 1.6 or less, far still more preferably 1.5 or less, especially 1.4 or less. To control the draft ratio within this specified range makes it possible to prevent the deformation or destruction of the pores of the membrane and makes it possible for the membrane to exhibit membrane performance sustainability and sharp fractionation performance.

The membrane-forming speed (or the spinning speed) is not limited, in so far as a hollow fiber membrane with no defect can be obtained and high productivity can be ensured. The spinning speed is preferably from 5 to 40 m/min., more preferably from 7 to 30 m/min., still more preferably from 7 to 20 m/min. When the spinning speed is too low, the productivity of the membrane tends to lower. When the spinning speed is too high, it becomes difficult to ensure the above-described spinning conditions, particularly the residence time in the air gap area and the residence time in the coagulating bath.

After that, the hollow fiber membrane is washed in the washing step. The method for washing the membrane is not limited. In view of the washing effect, safety and facility, preferably, the hollow fiber membrane is directly fed on-line into a washing bath filled with hot water, and is then wound up. The temperature of the hot water to be used is preferably from a room temperature to 100° C., more preferably from 30 to 90° C. When the temperature of the hot water is too low, the washing effect becomes insufficient. When this temperature is too high, such water can not be used as the washing liquid.

After the washing step, preferably, the polymeric porous hollow fiber membrane is subjected to a heating treatment so as to inhibit a change in the membrane performance in use or due to the washing operation and to ensure the sustainability, stability and recoverability of the membrane performance. This heat treatment is carried out by immersing the hollow fiber membrane in hot water, so that the solvent and the non-solvent left to remain in the hollow fiber membrane concurrently are expected to be washed off and removed.

To obtain the polymeric porous hollow fiber membrane of the present invention 2, preferably, prior to the immersion in hot water, the hollow fiber membrane is aged for some time, while being in contact with an aqueous solution of a solvent and a non-solvent. This aging of the hollow fiber membrane optimizes the content of the hydrophilic polymer in the membrane and the state of the hydrophilic polymer in the membrane, so that the interaction between the membrane with polyphenol is considered to be optimized. The concentration of the aqueous solution of the solvent and the non-solvent in this step is preferably from 30 to 70% by weight in the organic component; the temperature thereof is preferably from 15 to 30° C.; and the contact time is preferably from 10 to 180 mins.

The aging of the hollow fiber membrane may be carried out by again immersing the hollow fiber membrane perfectly free of the organic component in the aqueous solution of the solvent and the non-solvent. However, this aging can be simply done by controlling the washing conditions on the line after the spinning step, to thereby adjust the concentration of the organic component in the inner liquid within a preferable range, and aging the hollow fiber membrane as it is, at a preferable temperature for a preferable time, as described above. In concrete, the hollow fiber membrane is preferably washed with water under the condition in which the values of S and H defined by the following equations satisfy a relationship of the equation: H/S=500 to 2,500 [8]:

$S$=the second power of the radius of the inner diameter of the hollow fiber membrane [mm$^2$]×the concentration of the organic component in the inner liquid [%]÷100  [6]

$H$=the residence time of the hollow fiber membrane in the water washing bath [min.]×the water temperature of the water washing bath [K]  [7]

(when there are a plurality of water washing baths, the value of H is calculated for each of the baths, and the total of the values of H is defined as H.).

In this regard, the concentration of the organic component in the water washing bath should be always 1/10 or less of the above-described concentration of the organic component by appropriately replenishing with the washing liquid.

The temperature of the hot water for use in the heat treatment of the aged hollow fiber membrane is preferably from 60 to 100° C., more preferably from 70 to 90° C.; and the treating time is preferably from 30 to 120 mins., more preferably from 40 to 90 mins., still more preferably from 50 to 80 mins. When the temperature of the hot water is lower than the lower limit, and when the treating time is shorter than the lower limit, heat history applied to the hollow fiber membrane becomes insufficient, and thus, the sustainability and stability of the membrane performance tend to lower, and the washing effect also becomes insufficient with the result that the elute tends to increase. When the temperature of the hot water is higher than the upper limit, and when the treating time is longer than the upper limit, water is boiled, or the productivity tends to lower, since a longer time is required for the treatment. The bath ratio of the hollow fiber membrane to hot water is not limited, in so far as the hollow fiber membrane can be sufficiently immersed in the hot water. However, the use of so much hot water is likely to lower the productivity.

The hollow fiber membrane subjected to the heat treatment is dried and thus is finished. As the drying method, there can be employed a variety of the conventional methods such as drying in an air, drying under reduced pressure, drying with a hot air, etc. Microwave drying which recently has been employed to dry a blood-treating membrane also can be used. However, the drying with a hot air is preferably employed, since a lot of hollow fiber membranes can be efficiently dried in a simple apparatus. By subjecting the hollow fiber membrane to the above-described heat treatment before drying, change in the membrane performance because of a hot air can be suppressed. While the temperature of the hot air for drying is not limited, it is preferably from 40 to 100° C., more preferably from 50 to 80° C. When the temperature of the hot air is lower than the lower limit, a longer time is required to dry the membrane. When the temperature is higher than the upper limit, the cost for an energy generating a hot air tends to increase. When the temperature of the hot air exceeds the temperature of the above-described hot water, the deterioration of the membrane is facilitated, and thus, the membrane performance tends to degrade. Therefore, the temperature of the hot air is preferably lower than the temperature of the hot water.

EXAMPLES

Hereinafter, the effectiveness of the present inventions 1 and 2 will be described by way of Examples thereof, which should not be construed as limiting the scope of the present invention in any way. The methods for evaluation in the following Examples are described below.

1. Observation and Analysis of Structure of Hollow Fiber Membrane with Electron Microscope A dried hollow fiber membrane was cut, and the inner and outer surfaces and the wall section of the hollow fiber membrane were photographed with a scanning electron microscope (SEM) with a magnification of 10,000 or 2,000. The SEM photograph was fetched in a computer with a resolution of 466 dpi, and was analyzed using an image analysis software so as to determine the porosity, the average pore area and the pore distribution of the membrane. In concrete, the fetched image was processed into binary data to obtain a picture in which the pore portions were colored black and in which the constituent polymer portions were colored white. This picture was analyzed to find the number of the pore portions, the areas of the respective pore portions and the sum of the respective pore areas. The porosity of the membrane was calculated from the total area of the read image and the sum of the areas of the pore portions by the equation [3]:

Porosity [%]100×(the sum of the areas of the pore portions/the total area of the read image)  [3].

The average pore area was calculated from the sum of the areas of the pore portions and the number of the pore portions, and the shapes of the pores approximated circles, and the average pore diameter was calculated from the average pore area (using the following equations [4] and [5]):

The area of the pore (an average pore area) [$\mu m^2$]the sum of the areas of the pore portions/the number of the pore portions  [4], and the pore diameter (an average pore diameter) [$\mu m$]= (the average pore area/$\pi$)$^{1/2}$  [5].

The diameters of the pores whose shapes approximated circles were similarly calculated from the areas of the respective pore portions, and the results thereof were fetched into a spreadsheet software to create a histogram and to summarize it as a pore distribution.

2. Fabrication of Miniature Module

A hollow fiber membrane was cut into pieces with lengths of about 30 cm, which were bundled at their both ends with paraffin films to obtain a bundle of hollow fiber membranes. Both the ends of the bundle of hollow fiber membranes were inserted into pipes (or sleeves), respectively, and were fixed with an urethane potting agent. The end portions of the bundle of hollow fiber membranes were cut to obtain a miniature module which was fixed at its both ends with the sleeves and was opened at its both ends. The number of the hollow fiber membranes was appropriately selected so that the surface area of the inner surfaces of the membranes could be from 50 to 100 cm$^2$.

3. Fabrication of Module

A hollow fiber membrane was cut into pieces with lengths of about 30 cm, which were wrapped in a polyethylene film to obtain a bundle of hollow fiber membranes. This bundle of the hollow fiber membranes was inserted into a cylindrical polycarbonate module casing, and was hardened at its both ends with an urethane potting agent. The end portions of the bundle were cut to obtain a module opened at its both ends. The number of the hollow fiber membranes was appropriately selected so that the surface area of the inner surfaces of the membranes could be about 200 cm$^2$. The cylindrical module casing had ports at 2 portions of its cylindrical surface to thereby perfuse the outer surfaces of the hollow fiber membranes with a fluid. The cylindrical module casing was capped at its both ends to perfuse the inner surfaces of the hollow fiber membranes with the fluid.

4. Fabrication of Loop-Shaped Miniature Module

A hollow fiber membrane was cut into pieces with lengths of about 40 cm, which were loop-like bundled and were fixed at their ends with a paraffin film. The end portions of the loop-shaped bundle of the hollow fiber membranes were inserted into a pipe (or a sleeve) and were hardened with an urethane potting agent. The end portions of the bundle were cut to obtain a loop-shaped miniature module fixed at its both ends with the sleeve. The number of the hollow fiber membranes was appropriately selected so that the surface area of the inner surfaces of the membranes could be from 20 to 50 cm$^2$.

5. Measurement of Inner Diameter and Thickness of Hollow Fiber Membrane

A hollow fiber membrane was cut with a sharp-edged razor vertically to its lengthwise direction, and the section of the hollow fiber membrane was observed with a microscope with a magnification of 20. The inner diameters and the outer diameters of the hollow fiber membranes (n=10) were measured to find average values of the inner and outer diameters:

The thickness of the membrane [$\mu m$]={(the outer diameter)−(inner diameter)}/2

6. Calculation of Membrane Area

The membrane area of a module was calculated based on the inner diameter of the hollow fiber membrane. The membrane area of the module was calculated by the following equation [9]:

$$A = n \times \pi \times d \times L \quad [9],$$

wherein n is the number of the hollow fiber membranes; π is the ratio of the circumference of a circle to its diameter; d is the inner diameter [m] of the hollow fiber membrane; L is the effective length [m] of the hollow fiber membrane in the module.

7. Measurement of Critical Particle Diameter of Fine Particle to be Removed

A monodispersion polystyrene latex suspension (the concentration of the stock solution: 10 w/v %) was diluted with an aqueous solution of 0.1% by vol. of Tween 20 so that the concentration of the polystyrene latex suspension could be 0.01 w/v % (hereinafter referred to as a PSt-Tween solution). This PSt-Tween solution was introduced into the inner hollow portions of the hollow fiber membranes from one end of the miniature module (the inlet side) and was allowed to leak out from the other end of the miniature module (the outlet side). At this point of time, the end portion of the module on the outlet side was sealed, and the PSt-Tween solution was then successively introduced from the inlet side of the module to carry out dead end filtration through the hollow fiber membranes. Likewise, filtration of an aqueous solution of 0.1% by vol. of Tween 20, containing no polystyrene latex suspension was carried out. The absorbance of the solution at 250 nm was measured, and a polystyrene latex-rejection Rj was calculated by the following equation [10]:

$$Rj[\%] 100 \times (ApPSt - ApT)/(AfPSt - AfT) \quad [10]$$

wherein ApPSt was the absorbance of the filtrate of the PSt-Tween solution at 250 nm; ApT was the absorbance of the filtrate of the aqueous solution of 0.1% by vol. of the Tween 20 at 250 nm; AfPSt was the absorbance of the PSt-Tween solution introduced into the miniature module at 250 nm; and AfT was the absorbance of the aqueous solution of 0.1% by vol. of Tween 20 at 250 nm. The particle diameter of the monodispersion polystyrene latex was changed, and Rj described above was determined. A minimum particle diameter inducing a relationship of Rj≥95% was found, and this minimum particle diameter was defined as the critical diameter of fine particle to be removed.

8. Measurement of Bubble Point and Calculation of Maximum Pore Diameter

A whole of a loop type miniature module was immersed in a sufficient amount of 2-propanol (hereinafter referred to as iPA) for one hour or longer, and iPa was allowed to infiltrate the inner hollow portions and the wall portions of the hollow fiber membranes. When the entire hollow fiber membranes in the loop type module had been immersed in iPA, the sleeve was connected to a nitrogen line equipped with a pressure indicator so as to monitor an applied pressure. The loop type module was then compressed at a rate of 1 bar per min. A point of time at which bubbles had started to be constantly emitted from the wall portions of the hollow fiber membranes was recorded as a bubble point P [bar]. Measurement of bubble point is performed on three modules for each one sample, and an average value of the values of the bubble points was defined as a bubble point relative to the sample. Further, the maximum pore diameter dBmax was calculated from the bubble point (P [bar]) measured using iPA, by the following equation [11]:

$$dBmax [\mu m] = 0.0286 \times 22.9/P \quad [11].$$

9. Measurement of Water Permeability (Simply Referred to as Pure Water Flux)

A circuit was connected to each of the two sites of an end cap of a module (which are referred to as the inner inlet and the inner outlet, respectively) so as to measure an inflow pressure of pure water to the module and an outflow pressure of the pure water from the module. The inner and outer surfaces of the hollow fiber membranes were filled with pure water. Pure water was introduced into the module from its inner inlet, and the flow of the pure water was stopped by pinching the circuit connected to the inner outlet of the module with forceps (a downstream side from a pressure-measuring point), and a whole of the pure water introduced from the inner inlet of the module was filtered. Pure water maintained at 25° C. was poured into a compression tank and was supplied to the module insulated in a 25° C. thermostat bath while the pressure was being controlled with a regulator, and the amount of the filtrate outflowing from the fluid outlet of the module was measured with a measuring cylinder. The transmembrane pressure (TMP) was calculated by the following equation:

$$TMP = (Pi + Po)/2 \quad [12],$$

wherein Pi was a pressure at the inner inlet of the module; and Po was a pressure at the inner outlet of the module. The TMP was changed at four different points to measure the amounts of the flow amounts by filtration. The pure water Flux [L/h/bar] was calculated from the slope representing their relationship. The correlation coefficient between TMP and the flow amount by filtration should be 0.999 or more. The pure water Flux of the hollow fiber membranes was calculated from the membrane area and the water permeability of the module:

$$\text{Pure water Flux} = \text{pure water Flux}(M)/A \quad [13]$$

wherein the pure water Flux was the water permeability of the hollow fiber membranes [L/m$^2$/h/bar]; and the pure water Flux (M) was the water permeability of the module [L/h/bar]; and A was the membrane area [m$^2$] of the module.

10. Measurement of PVP Contents of Hollow Fiber Membrane Surfaces

One hollow fiber membrane was applied to a double-sided adhesive tape and was cut lengthwise to open the inner surface of the membrane. The opened hollow fiber membrane was applied to a sample table so as to be subjected to measurement by electron spectroscopy for chemical analysis (or ESCA). This operation was conducted to measure the inner surface of the hollow fiber membrane. In measurement of the outer surface of the hollow fiber membrane, it was not needed to cut the hollow fiber membrane for opening the inner surface thereof. That is, the hollow fiber membrane was simply applied to the sample table with a double-sided adhesive tape for measurement. The measuring conditions are described below:

Measuring Apparatus: ULVAC-PHI ESCA 5800
Excitation X-ray: MgK α-ray
Output of X-ray: 14 kV, 25 mA
Photo-electron escape angle: 45°
Analyzed diameter: 400 μmφ
Path energy: 29.35 eV
Resolution: 0.125 eV/step
Degree of vacuum: about $10^{-7}$ Pa or lower The PVP content in the membrane surface was calculated from the found value (N) of nitrogen and the found value (S) of sulfur, using the following equation [14] or [15].

<PVP-containing PES Membrane>

$$PVP \text{ content}[\% \text{ by weight}] = 100 \times (N \times 111)/(N \times 111 + S \times 232) \quad [14]$$

<PVP-Containing PSf Membrane>

$$PVP\ content[\%\ by\ weight]=100\times(N\times111)/(N\times111+S\times442) \quad [15]$$

11. Measurement of PVP Content in Entire Hollow Fiber Membrane

A hollow fiber membrane was dissolved in DMSO-d6, and 1H-NMR spectrum was measured at 60° C. Avance-500 manufactured by Brucker was used for the measurement. The content of PVP was calculated by the following equation [16] from the integrated intensity ratio between a peak (a) derived from the aromatic ring of a polysulfone-based polymer at and around 7.2 ppm and a peak (b) derived from the pyrrolidone ring of PVP at and around 2.0 ppm in the $^1$H-NMR spectrum.

$$PVP\ content\ [\%\ by\ weight]=\{(b/nb)\times111\times100\}/\{(a/na)\times Ma+(b/nb)\times111\} \quad [16]$$

wherein Ma was the molecular weight of the repeating unit of the polysulfone-based polymer; the molecular weight of the repeating unit of the PVP was 111; na was the number of protons of the peak a in the repeating unit; and nb was the number of protons of the peak b in the repeating unit.

12. Adsorption of Polyphenol onto Hollow Fiber Membrane

Sanfenone 100S extracted from green tea manufactured by Taiyo Kagaku Co., Ltd. was dissolved in pure water to form a 100 ppm solution (hereinafter referred to as a green tea polyphenol solution). A hollow fiber membrane which was 10 cm$^2$ in total of the areas of its inner and outer surfaces was immersed in this green tea polyphenol solution (10 mL) and was gently stirred at a room temperature for 60 mins. The green tea polyphenol solution which had not yet contacted the hollow fiber membrane, and the green tea polyphenol solution which already had contacted the hollow fiber membrane were appropriately diluted, respectively, and the absorbances of the respective diluted solutions at 280 nm were measured, and the polyphenol adsorption was calculated by the following equation [17]:

$$Polyphenol\ adsorption\ [mg/m^2]=1,000\times\{(AbsB\times Nb-AbsA\times Na)/(AbsB\times Nb)\}\times V/Sf \quad [17]$$

wherein AbsB was the absorbance of the green tea polyphenol solution which had not yet contacted the hollow fiber membrane; Nb was a dilution multiplying factor when the absorbance of the green tea polyphenol solution which had not yet contacted the hollow fiber membrane was measured; AbsA was the absorbance of the green tea polyphenol solution which already had contacted the hollow fiber membrane; Na was a dilution multiplying factor when the absorbance of the green tea polyphenol solution which already had contacted the hollow fiber membrane was measured; V was the amount [mL] of the green tea polyphenol solution used; and Sf was the total [cm$^2$] of the areas of the outer and inner surfaces of the hollow fiber membrane used.

13. Measurement of Wine Permeability (Hereinafter Referred to as Wine Flux)

The wine permeability of the present invention 1 was measured as follows.

A unrefined wine containing yeast commercially available from TAMBA WINE LTD. [TAMBA green wine NIGORI 2005] or a unrefined wine commercially available from Hitomiwinery [NIGORI fresh wine-RIN-red] was diluted with "Wine Life [red]" commercially available from Mercian Corporation so that the cloudiness of the wine mixture could be 10 NTU (hereinafter referred to as wine for evaluation). A module was immersed in RO water for one hour or longer, and the RO water was then changed over to the wine for evaluation to allow the wine for evaluation to infiltrate the inner and outer surfaces of the module. A container was filled with the wine for evaluation and was controlled in temperature at 22° C. A circuit for the wine for evaluation was made so that the inner surface of the module could be perfused with the wine for evaluation from the container through a pump, and then could return to the container, and so that the wine for evaluation, filtered by the hollow fiber membranes, also simultaneously could return to the container. Further, the circuit was made so that the inflow pressure of the wine for evaluation to the module and the outflow pressure thereof from the module could be measured. The wine for evaluation was introduced from the inner inlet of the module so that the wine for evaluation could flow in the hollow portions of the hollow fiber membranes at a flow rate of 1.5 m/sec. The TMP was controlled to about 1.5 bar. In this state, the hollow portions of the hollow fiber membranes were perfused with the wine for evaluation, while a part of the wine was being successively filtered (cross flow filtration). At a point of time when a predetermined time had passed, the amount of the wine filtered for a predetermined time was measured (for example, the amount of the filtered wine after 10 to 11 minutes had passed after the start of the perfusion, and the amount of the filtered wine after 20 to 21 minutes had passed after the start of the perfusion). The wine Flux was calculated by the following equation [18]:

$$Wine\ Flux\ [L/m^2/h/bar]=(the\ filtered\ amount\ of\ the\ wine\ per\ one\ min.\ [L/min.]\times60/A)/TMP[bar] \quad [18]$$

wherein A was the membrane area [m$^2$] of the module.

14. Measurement of Wine Permeability (Referred to as Wine Flux)

The wine permeability of the present invention 2 was measured as follows.

A unrefined wine commercially available from Hitomiwinery [NIGORI fresh wine-RIN-red] was diluted with "Wine Life [red]" commercially available from Mercian Corporation so that the cloudiness of the wine mixture could be 10 NTU (hereinafter referred to as wine for evaluation). A module was immersed in RO water for one hour or longer, and the RO water was then changed over to the wine for evaluation, to allow the wine to infiltrate the inner and outer surfaces of the module. A container was filled with the wine for evaluation and was controlled in temperature at 22° C. A circuit for the wine for evaluation was made so that the inner surface of the module could be perfused with the wine for evaluation from the container through a pump, and then that the wine could return to the container, and so that the wine for evaluation, filtered by the hollow fiber membranes, also simultaneously could return to the container. Further, the circuit was made so that the inflow pressure of the wine for evaluation to the module and the outflow pressure thereof from the module could be measured. The wine for evaluation was introduced from the inner inlet of the module so that the wine for evaluation could flow in the hollow portions of the hollow fiber membranes at a flow rate of 1.5 m/sec. The TMP was controlled to about 1.5 bar. In this state, the hollow portions of the hollow fiber membranes were perfused with the wine for evaluation, while a part of the wine was being successively filtered (crossflow filtration). At a point of time when a predetermined time had passed, the amount of the wine filtered for a predetermined time was measured (for example, the amount of the filtered wine after 10 to 11 minutes had passed after the start of the perfusion, and the amount of the filtered wine after 20 to 21 minutes had passed after the start of the perfusion). The wine Flux was calculated by the following equation [16]:

Wine Flux [L/m²/h/bar]=(the filtered amount of the wine per one min. [L/min.]×60/A)/TMP[bar]   [16]

wherein A was the membrane area [m²] of the module.

15. Measurement of Content of Insoluble Component

A solution of a hollow fiber membrane (10 g) dissolved in dimethylformamide (100 ml) was subjected to centrifugal separation at 1,500 rpm for 10 minutes, and the resulting supernatant was removed. The residual insoluble solid was again admixed with dimethylformamide (100 ml), and the mixture was stirred and was then subjected to centrifugal separation under the same conditions, and the resulting supernatant was removed. The residual solid was again admixed with dimethylformamide (100 ml), and the mixture was stirred and was subjected to similar centrifugal separation, and the resulting supernatant was removed. The residual solid was evaporated to a dryness, and the content of the insoluble component was found from the amount of the dried solid.

Examples of the present invention 1 were described below.

Example 1

PES (Sumika EXCEL® 4800P manufactured by Sumitomo Chem tech) (19.0 parts by weight), PVP (Kolidone® K30 manufactured by BASF) (3.0 parts by weight), NMP manufactured by Mitsubishi Chemical Corporation (35.1 parts by weight) and TEG manufactured by MITSUI CHEMICALS, INC. (42.9 parts by weight) were mixed and dissolved at 70° C. for 3 hours to form a homogenous solution. The system was decompressed at 70° C. from an atmospheric pressure to −700 mmHg. Immediately after that, the system was sealed so as not to change the composition of the solution due to the volatilization of the solvent or the like, and the solution was left to stand for 2 hours so as to be defoamed. The resulting solution was used as a membrane-forming solution. On the other hand, a mixture of NMP (35.1 parts by weight), TEG (42.9 parts by weight) and RO water (22.0 parts by weight) was prepared as a inner liquid. The membrane-forming solution and the inner liquid were discharged from the annular portion and the center portion of a double tube nozzle, respectively, and the resultant filament was allowed to pass through an air gap with a length of 20 mm and was then introduced into a coagulating bath filled with an external coagulating liquid consisting of a mixture of NMP (13.5 parts by weight), TEG (16.5 parts by weight) and RO water (70.0 parts by weight). In this operation, the nozzle temperature was 65° C., and the temperature of the external coagulating liquid was 55° C. The resulting hollow fiber membrane was drawn from the coagulating bath and was wound up at a rate of 10 m/min. In the coagulating bath, three cylindrical guides with diameters of 50 mm were arranged to gradually change the feeding direction of the hollow fiber membrane to remove the same from the coagulating bath. The immersion depth for the hollow fiber membrane in the coagulating bath was maximum 800 mm, and the feeding distance for the hollow fiber membrane in the same bath was 2,000 mm. The amounts of the membrane-forming solution and the inner liquid to be discharged were controlled so as to obtain the hollow fiber membrane with an inner diameter of about 1,200 μm and a thickness of about 340 μm.

Figure 3:
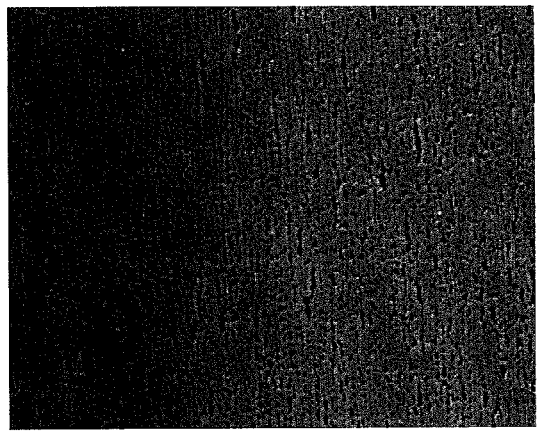
FIG. 3 shows the electron microscopic photograph (magnification: 10,000) of the inner surface of a hollow fiber membrane (A) obtained in Example 1.
Figure 4:
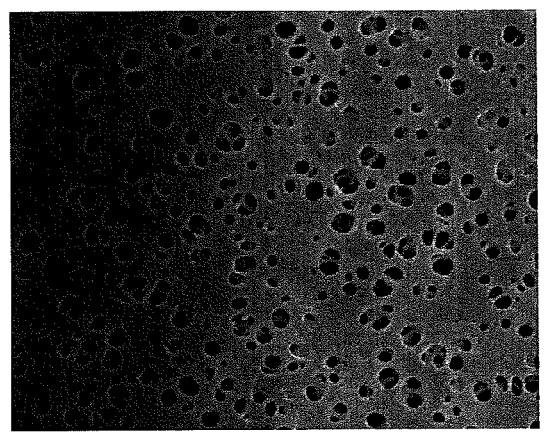
FIG. 4 shows the electron microscopic photograph (magnification: 10,000) of the outer surface of the hollow fiber membrane (A) obtained in Example 1.
Figure 5:
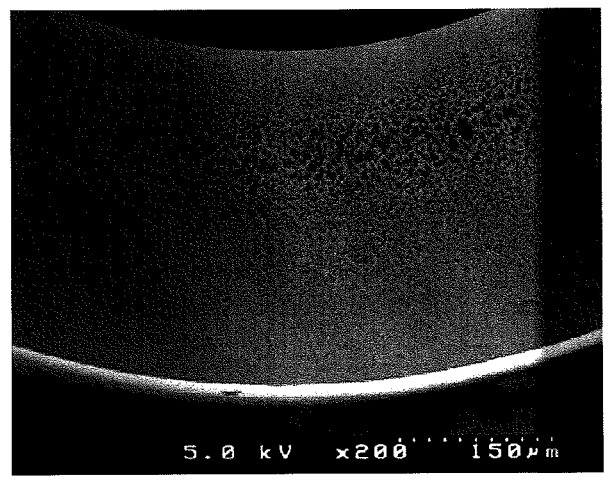
FIG. 5 shows the electron microscopic photograph (magnification: 200) of the section of the hollow fiber membrane (A) obtained in Example 1.

A bundle of the hollow fiber membranes was immersed in Ro water at 80° C. for 60 minutes for heat treatment. After that, the bundle of the hollow fiber membranes was dried with a hot air at 60° C. for 10 hours to obtain hollow fiber membranes (A) with inner diameters of 1,180 μm and thickness of 330 μm. The inner surface, the outer surface and the wall section (each of the eight portions obtained by dividing the membrane wall in its thickness direction) of the hollow fiber membrane (A) were observed with SEM by the above-described method. The SEM photograph was subjected to image analysis to find the porosity and the pore diameter of the respective portions of the membrane. The SEM photographs of the inner surface, the outer surface and the entire section of the hollow fiber membrane are shown in FIGS. 3, 4 and 5, respectively. The results of the measurement of the porosity and the pore diameter are shown in Table 1. In Table 1, IS means the inner surface of the hollow fiber membrane, and OS means the outer surface thereof; and CS1, CS2, CS3, CS4, CS5, CS6, CS7 and CS8 mean the eight portions of the wall section of the hollow fiber membrane obtained by dividing the wall section of the membrane from the inner surface of the membrane toward the outer surface thereof (numbered from one to eight in order from the inner surface). Skin layers were formed on the inner and outer surfaces of the hollow fiber membrane, and the diameters of the pores in the inner surface (0.05 μm) were found to be smaller than the diameters of the pores in the outer surface (0.12 μm), and the porosity and the pore diameter at the portion CS3 were found to be maximum (58%, 1.34 μm).

TABLE 1

| Part 1 | | | | | | |
|---|---|---|---|---|---|---|
| | Site | IS | CS1 | CS2 | CS3 | CS4 |
| Hollow fiber membrane (A) | Pore diameter [μm] | 0.05 | 0.30 | 0.75 | 1.34 | 1.05 |
| | Porosity [%] | 15 | 43 | 48 | 58 | 52 |
| Hollow fiber membrane (D) | Pore diameter [μm] | 0.05 | 0.31 | 0.74 | 1.32 | 1.05 |
| | Porosity [%] | 16 | 44 | 49 | 60 | 51 |

| Part 2 | | | | | | |
|---|---|---|---|---|---|---|
| | Site | CS5 | CS6 | CS7 | CS8 | OS |
| Hollow fiber membrane (A) | Pore diameter [μm] | 0.71 | 0.56 | 0.35 | 0.25 | 0.12 |
| | Porosity [%] | 48 | 46 | 44 | 41 | 12 |
| Hollow fiber membrane (D) | Pore diameter [μm] | 0.68 | 0.51 | 0.35 | 0.24 | 0.10 |
| | Porosity [%] | 48 | 45 | 42 | 40 | 11 |

Figure 6:
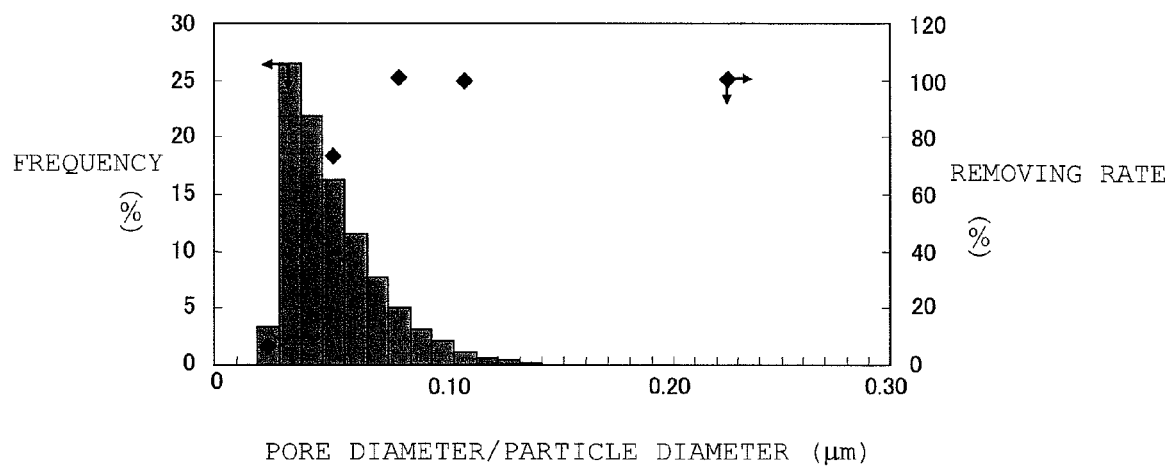
FIG. 6 shows a graph indicating the pore distribution of the inner surface of the hollow fiber membrane (A) obtained in Example 1, and the polystyrene latex-rejection of the hollow fiber membrane (A).

FIG. 6 shows a graph in which the distribution of the diameters of the pores in the inner surface of the hollow fiber membrane (A), and the rejections of polystyrene latex particles with diameters of 0.02 μm, 0.05 μm, 0.08 μm, 0.11 μm and 0.23 μm were plotted at once. From the rejections of the polystyrene latex particles with the respective diameters, the critical diameter of a fine particle ($\phi$max) to be removed by the hollow fiber membrane (A) was found to be 0.08 μm. In the inner surface of the hollow fiber membrane (A), the ratio DR [%] of the pores having diameters exceeding $\phi$max was 7.6%. The value of $\phi$max and the value of DR are shown in Table 2.

The dBmax (a maximum pore diameter found at a bubble point) of the hollow fiber membrane (A), measured and calculated by the above-described method, is shown in Table 3; and the pure water Flux, the content of PVP in the entire hollow fiber membrane, the content of PVP in the inner surface of the hollow fiber membrane, and the content of PVP in the outer surface of the hollow fiber membrane are shown in Table 2. In Tables, dBmax means the maximum pore diameter calculated from the bubble point measured using iPA; Ca means the content of PVP in the entire hollow fiber membrane; Ci means the content of PVP in the inner surface of the hollow fiber membrane; and Co means the content of PVP in the outer surface of the hollow fiber membrane. It was found that the pores with dBmax (0.20 μm) were present between ($\frac{1}{10,000}$)×pure water Flux (0.115) and ($\frac{1}{4,000}$)×pure water Flux (0.2875). It was also found that Ca (1.8% by weight), Ci (29% by weight) and Co (24% by weight) had relationships of $1 \leq Ca \leq 10$, $Ca \leq Ci$, $Ca \leq Co$, and $Co \leq Ci$.

TABLE 2

| Sample | ID [μm] | Δd [μm] | Ci [wt. %] | Co [wt. %] | Ca [wt. %] | App [mg/m²] | Pure water Flux [L/m²/h/bar] |
|---|---|---|---|---|---|---|---|
| Hollow fiber membrane (A) | 1180 | 330 | 29 | 24 | 1.8 | 162 | 1150 |
| Hollow fiber membrane (B) | 1160 | 320 | 26 | 23 | 2.1 | 136 | 1240 |
| Hollow fiber membrane (C) | 195 | 29 | 27 | 38 | 3.4 | 102 | 390 |
| Hollow fiber membrane (D) | 1182 | 335 | 28 | 22 | 1.7 | 140 | 1140 |
| Hollow fiber membrane (E) | 1161 | 325 | 26 | 24 | 2.0 | 136 | 1210 |
| Hollow fiber membrane (F) | 1186 | 332 | 28 | 31 | 2.1 | 402 | 1411 |
| PE-MF membrane | 1340 | 460 | — | — | — | <1 | 1370 |
| PVDF-MF membrane | 1398 | 391 | — | — | — | <1 | 1590 |
| Hollow fiber membrane (G) | 196 | 30 | 29 | 41 | 3.5 | 117 | 370 |

A wine Flux was measured with a module fabricated using the hollow fiber membrane (A), according to the above-described method. The results are shown in Table 3. In Table 3, Wine Flux 1-30 means a wine Flux found when a wine was filtered (crossflow filtration) with a new module for 30 mins.; Wine Flux 1-120 means a wine Flux found when the wine further had been continuously filtered in 120 mins.; Wine Flux 2-30 means a wine Flux found as follows: the module was washed by reversely passing hot water of 60° C. from the outer surface of the hollow fiber membrane to the hollow portion thereof under a pressure of 2 bars for 10 mins., and then, a wine was filtered with this washed module for 30 mins. to find Wine Flux 2-30; the sustainability means a ratio of the value of Wine Flux 1-120 to the value of Wine Flux 1-30, which was expressed by percentage; and the recoverability means a ratio of the value of Wine Flux 2-30 to the value of Wine Flux 1-30, which was expressed by percentage. In addition, the turbidity of the wine obtained as the filtrate was measured when Wine Flux 1-120 was measured. The results are shown as the turbidities of the filtrates in Table 3.

TABLE 3

(Part 1)

| Sample | φmax [μm] | DR [%] | dBmax [μm] | WF1-30 | WF1-120 | WF2-30 |
|---|---|---|---|---|---|---|
| Wine before filtration | | | | | | |
| Hollow fiber membrane (A) | 0.08 | 7.6 | 0.20 | 56 | 42 | 53 |
| Hollow fiber membrane (B) | 0.08 | 4.3 | 0.21 | 62 | 48 | 56 |
| Hollow fiber membrane (C) | | | | 12 | 5 | 7 |
| Hollow fiber membrane (D) | 0.08 | 7.0 | 0.20 | 54 | 43 | 52 |
| Hollow fiber membrane (E) | 0.07 | 4.9 | 0.19 | 63 | 58 | 57 |
| Hollow fiber membrane (F) | 0.09 | 5.2 | 0.20 | 68 | 51 | 59 |
| PE-MF membrane | 0.19 | 32 | 0.26 | 71 | 42 | 34 |
| PVDF-MF membrane | 0.23 | 43 | 0.28 | 64 | 39 | 44 |
| Hollow fiber membrane (G) | — | — | — | 12 | 6 | 7 |

TABLE 3-continued (Part 2)

| Sample | Sustainability [%] | Recoverability [%] | Turbidity of filtrate [NTU] | Flavor [point] |
|---|---|---|---|---|
| Wine before fitration | | | 10 | 14 |
| Hollow fiber membrane (A) | 75 | 95 | <0.20 | 17 |
| Hollow fiber membrane (B) | 77 | 90 | <0.20 | 16 |
| Hollow fiber membrane (C) | 42 | 58 | <0.20 | 11 |
| Hollow fiber membrane (D) | 80 | 96 | <0.20 | 17 |
| Hollow fiber membrane (E) | 76 | 90 | <0.20 | 16 |
| Hollow fiber membrane (F) | 75 | 87 | <0.20 | 15 |
| PE-MF membrane | 57 | 73 | 0.46 | 12 |
| PVDF-MF membrane | 61 | 69 | 0.80 | 11 |
| Hollow fiber membrane (G) | 50 | 58 | <0.20 | 11 |

*WF: Wine Flux [L/m²/h/bar]

Example 2

PSf (P-3500 manufactured by Amoco) (18.5 parts by weight), PVP (Kolidone® K30 manufactured by BASF) (3.5 parts by weight), NMP manufactured by Mitsubishi Chemical Corporation (35.1 parts by weight) and TEG manufactured by MITSUI CHEMICALS, INC. (42.9 parts by weight) were mixed and dissolved at 70° C. for 3 hours to form a homogenous solution. The system was decompressed at 70° C. from an atmospheric pressure to −700 mmHg. Immediately after that, the system was sealed so as not to change the composition of the solution due to the volatilization of the solvent or the like, and the solution was left to stand for 2 hours so as to be defoamed. The resulting solution was used as a membrane-forming solution. On the other hand, a mixture of NMP (35.1 parts by weight), TEG (42.9 parts by weight) and RO water (22.0 parts by weight) was prepared as a inner liquid. The membrane-forming solution and the inner liquid were discharged from the annular portion and the center portion of a double tube nozzle, respectively, and the resultant filament was allowed to pass through an air gap with a length of 20 mm and was then introduced into a coagulating bath filled with an external coagulating liquid consisting of a mixture of NMP (13.5 parts by weight), TEG (16.5 parts by weight) and RO water (70.0 parts by weight). In this operation, the nozzle temperature was 63° C., and the temperature of the external coagulating liquid was 55° C. The resulting hollow fiber membrane was drawn from the coagulating bath and was wound up at a rate of 10 m/min. In the coagulating bath, three cylindrical guides with diameters of 50 mm were used to gradually change the feeding direction of the hollow fiber membrane to draw the same from the coagulating bath. The immersion depth for the hollow fiber membrane in the coagulating bath was maximum 800 mm, and the feeding distance for the hollow fiber membrane in the same bath was 2,000 mm. The amounts of the membrane-forming solution and the inner liquid to be discharged were so controlled that the hollow fiber membrane having an inner diameter of about 1,200 μm and a thickness of about 340 μm.

A bundle of such hollow fiber membranes was immersed in Ro water at 80° C. for 60 minutes for heat treatment. After that, the bundle of the hollow fiber membranes was dried with a hot air at 60° C. for 10 hours to obtain hollow fiber membranes (B) with inner diameters of 1,160 μm and thickness of 320 μm. The inner surface, the outer surface and the wall section (each of the eight portions obtained by dividing the membrane wall in its thickness direction) of the hollow fiber membrane (B) were observed with SEM by the above-described method. The SEM photograph was subjected to image analysis to find the porosity and the pore diameter of each of the portions of the membrane. In this regard, IS means the inner surface of the hollow fiber membrane, and OS means the outer surface thereof; and CS1, CS2, CS3, CS4, CS5, CS6, CS7 and CS8 mean the eight portions of the wall section of the hollow fiber membrane obtained by dividing the wall section of the membrane from the inner surface of the membrane toward the outer surface thereof. Skin layers were formed on the inner and outer surfaces of the hollow fiber membrane (B). The values indicating the structure of the membrane were described below. Further, the distribution of the pore diameters, $\phi$max and DR of the inner surface of the hollow fiber Membrane (B) were determined in the same manners as in Example 1. The results are shown in Table 3.

| | |
|---|---|
| Diameter of pores in IS: | 0.04 μm |
| Porosity of IS: | 8% |
| Diameter of pores in OS: | 0.05 μm |
| Porosity of OS: | 11% |
| Portion of section at which porosity became maximum: | CS3 |
| Diameter of pores in CS3: | 2.31 μm |
| Porosity of CS3: | 59% |

Further, the dBmax of the hollow fiber membrane (B) measured in the same manner as in Example 1 is shown in Table 3, and the pure water Flux, Ca, Ci and Co thereof are shown in Table 2. The dBmax was found to be between (1/10,000)×pure water Flux (0.124) and (1/4,000)×pure water Flux (0.310). It was also found that Ca, Ci and Co had relationships of 1≤Ca≤10, Ca≤Ci, Ca≤Co and Co≤Ci.

A wine Flux was measured with a module comprising the hollow fiber membrane (B) in the same manner as in Example 1. The results are shown in Table 3.

Comparative Example 1

PES (Sumika EXCEL® 4800P manufactured by Sumitomo Chem tech) (17.5 parts by weight), PVP (Kolidone® K90 manufactured by BASF) (4.5 parts by weight), DMAc (75.0 parts by weight) and RO water (3.0 parts by weight) were mixed and dissolved at 50° C. for 2 hours to form a homogenous solution. The system was decompressed at 50° C. from an atmospheric pressure to −700 mmHg. Immediately after that, the system was sealed so as not to change the composition of the solution due to the volatilization of the solvent or the like, and the solution was left to stand for 2 hours so as to be defoamed. The resulting solution was used as a membrane-forming solution. On the other hand, a mixture of DMAc (40.0 parts by weight) and RO water (60.0 parts by weight) was prepared as a inner liquid. The membrane-forming solution and the inner liquid were discharged from the annular portion and the center portion of a double tube nozzle, respectively, and the resultant filament was allowed to pass through an air gap with a length of 450 mm and was then introduced into a coagulating bath filled with an external coagulating liquid consisting of a mixture of DMAc (20.0 parts by weight) and RO water (80.0 parts by weight). In this operation, the nozzle temperature was 65° C., and the temperature of the external coagulating liquid was 60° C. The resulting hollow fiber membrane was drawn from the coagulating bath and was wound up at a rate of 75 m/min. In the coagulating bath, one rod-like guide with a diameter of 12 mm was used to change the feeding direction of the hollow fiber membrane to draw the same from the coagulating bath. The immersion depth for the hollow fiber membrane in the coagulating bath was maximum 200 mm, and the feeding distance for the hollow fiber membrane in the same bath was 600 mm. The amounts of the membrane-forming solution and the inner liquid to be discharged were so controlled that the hollow fiber membrane having an inner diameter of about 200 μm and a thickness of about 30 μm.

The resultant hollow fiber membrane was wrapped in a polyethylene film embossed at its surface, and was then cut into pieces with lengths of 27 cm to obtain a bundle of the hollow fiber membranes. This bundle of the hollow fiber membranes was immersed in RO water of 80° C. for 30 minutes. This operation was repeated 4 times, for heat-and-washing treatment. The bundle of the wet hollow fiber membranes was subjected to centrifugal dewatering at 600 rpm for 5 minutes and was exposed to microwave in a microwave generator which had an oven lined with a reflecting plate to carry out uniform heating, and was simultaneously dried for 60 minutes, while the inner pressure of the drier was being reduced to 7 kPa. The output of the microwave was decreased from the initial output of 1.5 kW, by every 0.5 kW at every interval of 20 minutes. By this drying treatment, a hollow fiber membrane (C) with an inner diameter of 195 μm and a thickness of 29 μm was obtained.

The structure of the hollow fiber membrane (C) was observed with SEM in the same manner as in Example 1. The hollow fiber membrane (C) had a skin layer on IS only, and was found to be an asymmetrical membrane in which the porosity increased from its inner surface toward its outer surface. The values indicating the structure of the hollow fiber membrane (C) were described below. The $\phi$max of the inner surface of this hollow fiber membrane was measured in the same manner as in Example 1. It was less than 0.02 μm in the measurement using polystyrene latex particles. However, precise measurement thereof was impossible. Accordingly, the calculation of DR was also impossible. In the measurement of dBmax, the filament of the membrane was broken before a bubble point, and thus, dBmax could not be measured. The pure water Flux, Ca, Ci and Co of the hollow fiber membrane were measured in the same manner as in Example 1. The results are shown in Table 2. Further, a wine Flux was measured with a module comprising the hollow fiber membrane (C) in the same manners as in Example 1. The results are shown in Table 3.

| | |
|---|---|
| Diameter of pores in IS: | 0.01 μm |
| Porosity of IS: | 8% |

| | |
|---|---|
| Diameter of pores in OS: | 0.53 μm |
| Porosity of OS: | 15% |
| Portion of section at which porosity became maximum: | None |

As was apparent from the results of the measurement of the wine permeability, the polymeric porous hollow fiber membranes of the present invention were found to be higher in wine Flux sustainability and recoverability and to be superior in membrane performance sustainability and recoverability. The turbidities of the wines obtained as the filtrates were low, and thus, the polymeric porous hollow fiber membranes of the present invention were found to concurrently exhibit excellent fractionation performance, including excellent permeability to a component to be filtered, and excellent removing ability to a component to be retained (a component not to be filtered). The specified arrangement and the specified membrane structure featuring the present invention are considered to contribute much to the exhibition of these excellent performances.

The present invention 2 is described by way of Examples thereof as follows.

Example 3

PES having hydroxyphenyl groups at its ends (Sumika EXCEL® 4800P manufactured by Sumitomo Chemtech) (19.2 parts by weight), PVP (Kolidone® K30 manufactured by BASF) (2.8 parts by weight), NMP manufactured by Mitsubishi Chemical Corporation (35.1 parts by weight) and TEG manufactured by MITSUI CHEMICALS, INC. (42.9 parts by weight) were mixed and dissolved at 70° C. for 3 hours to form a homogeneous solution. The system was decompressed at 70° C. from a normal pressure to −700 mmHg, and the system was then immediately sealed so as not to change the composition of the solution due to volatilization of the solvent or the like. The solution was left to stand in this state for 2 hours to be defoamed. The resultant solution was used as a membrane-forming solution. On the other hand, a mixture of NMP (35.1 parts by weight), TEG (42.9 parts by weight) and RO water (22.0 parts by weight) was prepared as a inner liquid. The membrane-forming solution and the inner liquid were discharged from the annular portion and the center portion of a double tube nozzle, respectively. The resulting filament was allowed to pass through an air gap with a length of 20 mm and was then introduced into a coagulating bath filled with an external coagulating liquid comprising a mixture of NMP (13.5 parts by weight), TEG (16.5 parts by weight) and RO water (70.0 parts by weight). In this operation, the nozzle temperature was 65° C., and the temperature of the external coagulating liquid was 55° C. Three cylindrical guides with diameters of 100 mm were used in the coagulating bath so as to gradually change the feeding direction of the hollow fiber membrane. That is, the feeding direction of the hollow fiber membrane was changed at radii of curvature of 50 mm and at three points. The depth of immersion of the hollow fiber membrane in the coagulating bath was maximum 800 mm, and the feeding distance of the hollow fiber membrane in the coagulating bath was 2,000 mm (see FIG. 1).

The hollow fiber membrane removed from the coagulating bath was fed to a water washing bath filled with hot water of 300K, a water washing bath filled with hot water of 310K, a water washing bath filled with hot water of 320K and a water washing bath filled with hot water of 330K, in this order. The passing times of the hollow fiber membrane in the respective water washing baths were 0.29 mins., 0.24 mins., 0.21 mins., and 0.19 mins., respectively. The hollow fiber membrane was wound up at a rate of 8.5 m/min. The amounts of the membrane-forming solution and the inner liquid to be discharged were controlled so that the inner diameter of the hollow fiber membrane could be about 1,200 μm (the radius of the hollow portion could be 0.6 mm), and the thickness thereof, about 340 μm. In this operation, the value of H/S defined by the above-described equations [6], [7] and [8] was calculated as follows:

(300×0.29+310×0.24+320×0.21+330×0.19)/(0.6×0.6×78÷100)=1,037.

The concentration of the organic component in the inner liquid filling the hollow portion of the hollow fiber membrane, found by this step, was 50%.

The wound hollow fiber membrane was made into a bundle of the hollow fiber membranes with lengths of about 1 m, which was then aged at 25° C. for 20 mins., while being filled with the inner liquid. Then, the bundle of the hollow fiber membranes was stood vertically to remove the inner liquid. The bundle of the hollow fiber membranes was immersed in RO water of 80° C. for 60 mins. for heat treatment thereof. After that, the bundle of the hollow fiber membranes was dried with a hot air of 60° C. for 10 hours to obtain a hollow fiber membrane (D) having an inner diameter of 1,182 μm and a thickness of 335 μm. The inner surface, the outer surface and the wall section of the hollow fiber membrane were observed with SEM according to the above-described method. The image analysis of the SEM photograph of the hollow fiber membrane was conducted to determine the porosities and pore diameters of the respective portions of the wall section of the hollow fiber membrane. The results of the measurement of the porosities and pore diameters are shown in Table 1. In Table 1, IS means the inner surface of the hollow fiber membrane; Os means the outer surface thereof; and CS1, CS2, CS3, CS4, CS5, CS6, CS7 and CS8 mean the eight portions into which the wall section of the hollow fiber membrane was equally divided from the inner surface to the outer surface (numbered 1 to 8 in order from the inner surface). It was found that the hollow fiber membrane had skin layers on its inner and outer surfaces, and that the porosity and the diameter of the pore became maximum (60%, 1.32 μm) at the portion CS3.

The inner diameter and thickness of the hollow fiber membrane (D), and the content of PVP in the inner surface of the hollow fiber membrane, the content of PVP in the entire hollow fiber membrane, and the adsorption of polyphenol and the pure water Flux of the hollow fiber membrane are shown in Table 2. In Table 2, ID means the inner diameter of the hollow fiber membrane; Δd means the thickness of the hollow fiber membrane; Ci means the content of PVP in the inner surface of the hollow fiber membrane; Ca means the content of PVP in the entire hollow fiber membrane; and App means the adsorption of polyphenol onto the hollow fiber membrane.

A wine Flux was measured with a module fabricated using the hollow fiber membrane (D), according to the above-described method. The results are shown in Table 3. In Table 3, Wine Flux 1-30 means a wine Flux found when a wine was filtered (crossflow filtration) with a new module for 30 mins.; Wine Flux 1-120 means a wine Flux found when the wine had been continuously filtered for 120 mins.; Wine Flux 2-30 means a wine Flux found as follows: the module used for the filtration of the wine for 120 mins. was washed by reversely filtering hot water of 60° C. from the outside of the hollow fiber membrane to the hollow portion thereof under a pressure of 2 bars for 10 mins., and this module was used to filter a wine for 30 mins. to find a wine Flux as the Wine Flurx 2-30; the sustainability means a ratio of the value of Wine Flux 1-120 to the value of Wine Flux 1-30, which was expressed in percentage; and the recoverability means a ratio of the value of Wine Flux 2-30 to the value of Wine Flux 1-30, which was expressed in percentage. In addition, the turbidity of the wine obtained as the filtrate was measured when Wine Flux 1-120 was measured. The results are shown as the turbidities of the filtrates in Table 3.

In view of a filtration efficiency, it is desirable that both the sustainability and the recoverability show higher values. The sustainability relates to filtration performance sustainability found when filtration using a membrane is continuously carried out. A membrane showing a higher sustainability is less in degradation of the filtration performance, even if the frequency to wash the membrane is decreased in number. Thus, such a membrane is preferable. Specifically, a membrane which shows a sustainability of less than 60%, defined in the present invention, is practically insufficient in filtration performance sustainability, and the filtration operability of the membrane is below a practical level. The sustainability is preferably 70% or more, more preferably 80% or more, from the viewpoint of the filtration operability.

The recoverablity relates to the recoverablity of filtration performance of a membrane by washing through reverse filtration. A membrane showing a higher recoverability can be used over a long period of time, by appropriately washing the same membrane, and such a membrane has a longer lifetime. Specifically, when the recoverability of a membrane, defined in the present invention, is lower than 80%, degradation of the membrane performance with time during an actual filtering operation is significant, and thus, such a membrane is unsuitable for practical use. The recoverability is preferably 90% or more, more preferably 95% or more, from the viewpoint of the filtration operability.

A wine before filtration and the wine as a filtrate were tasted and evaluated with respect to the flavors thereof. The sourness, rough taste, sweetness and harmonized taste of the wine were marked on the basis of 5 points, respectively, and the wine was evaluated based on the total points. Full marks were given to each of the above flavor items, when a suitable degree was found therein. A demerit mark was given to too strong or too weak a taste. Ten persons evaluated the wine with respect to the respective items, and the average of the resultant points of the flavor of the wine is shown in Table 3.

Example 4

PSf (P-3500 manufactured by Amoco) (19.0 parts by weight), PVP (Kolidone® K30 manufactured by BASF) (3.0 parts by weight), NMP manufactured by Mitsubishi Chemical Corporation (35.1 parts by weight) and TEG manufactured by MITSUI CHEMICALS, INC. (42.9 parts by weight) were mixed and dissolved at 70° C. for 3 hours to form a homogeneous solution. The system was decompressed at 70° C. from a normal pressure to −700 mmHg, and the system was then immediately sealed so as not to change the composition of the solution due to volatilization of the solvent or the like. The solution was left to stand in this state for 2 hours to be defoamed. The resultant solution was used as a membrane-forming solution. On the other hand, a mixture of NMP (35.1 parts by weight), TEG (42.9 parts by weight) and RO water (22.0 parts by weight) was prepared as a inner liquid. The membrane-forming solution and the inner liquid were discharged from the annular portion and the center portion of a double tube nozzle, respectively. The resulting filament was allowed to pass through an air gap with a length of 20 mm and was then introduced into a coagulating bath filled with an external coagulating liquid comprising a mixture of NMP (13.5 parts by weight), TEG (16.5 parts by weight) and RO water (70.0 parts by weight). In this operation, the nozzle temperature was 63° C., and the temperature of the external coagulating liquid was 55° C. Three cylindrical guides with diameters of 100 mm were used in the coagulating bath so as to gradually change the feeding direction of the hollow fiber membrane. That is, the feeding direction of the hollow fiber membrane was changed at radii of curvature of 50 mm and at three points. The depth of immersion of the hollow fiber membrane in the coagulating bath was maximum 800 mm, and the feeding distance of the hollow fiber membrane in the coagulating bath was 2,000 mm (see FIG. 1). The hollow fiber membrane drawn from the coagulating bath was fed to a water washing bath filled with hot water of 300K, a water washing bath filled with hot water of 310K, a water washing bath filled with hot water of 320K and a water washing bath filled with hot water of 330K, in this order. The passing times of the hollow fiber membrane in the respective water washing baths were 0.29 mins., 0.24 mins., 0.21 mins., and 0.19 mins., respectively. The hollow fiber membrane was wound up at a rate of 8.5 m/min. The amounts of the membrane-forming solution and the inner liquid to be discharged were controlled so that the inner diameter of the hollow fiber membrane could be about 1,200 μm (the radius of the hollow portion could be 0.6 mm), and the thickness thereof, about 340 μm. In this operation, the value of H/S defined by the above-described equations [6], [7] and [8] was calculated as follows:

$$(300\times0.29+310\times0.24+320\times0.21+330\times0.19)/(0.6\times0.6\times78\div100)=1{,}037.$$

The concentration of the organic component in the inner liquid filling the hollow portion of the hollow fiber membrane, found by this step, was 48%.

The wound hollow fiber membrane was made into a bundle of the hollow fiber membranes with lengths of about 1 m, which was then aged at 25° C. for 20 mins., while being filled with the inner liquid. Then, the bundle of the hollow fiber membranes was stood vertically to remove the inner liquid. The bundle of the hollow fiber membranes was immersed in RO water of 80° C. for 60 mins. for heat treatment thereof. After that, the bundle of the hollow fiber membranes was dried with a hot air of 60° C. for 10 hours to obtain a hollow fiber membrane (E) having an inner diameter of 1,164 μm and a thickness of 325 μm. The inner surface, the outer surface and the wall section (the eight portions obtained by dividing the wall section in the thickness direction) of the hollow fiber membrane were observed with SEM according to the above-described method. The image analysis of the SEM photograph of the hollow fiber membrane was conducted to determine the porosities and pore diameters of the respective portions of the wall section of the hollow fiber membrane. In this regard, IS means the inner surface of the hollow fiber membrane; Os means the outer surface thereof; and CS1, CS2, CS3, CS4, CS5, CS6, CS7 and CS8 mean the eight portions into which the wall section of the hollow fiber membrane was equally divided from the inner surface to the outer surface. It was found that the hollow fiber membrane (E) had skin layers on its inner and outer surfaces. The values indicating the structure of the membrane are described below:

| | |
|---|---|
| Diameter of pores in IS: | 0.04 μm |
| Porosity of IS: | 9% |
| Diameter of pores in OS: | 0.05 μm |

| | |
|---|---|
| Porosity of OS: | 11% |
| Portion of section at which porosity became maximum: | CS3 |
| Diameter of pores in CS3: | 2.29 μm |
| Porosity of CS3: | 60%. |

The inner diameter and thickness of the hollow fiber membrane (E), and the content of PVP in the inner surface of the hollow fiber membrane, the content of PVP in the entire hollow fiber membrane, and the adsorption of polyphenol and the pure water Flux of the hollow fiber membrane are shown in Table 2.

A wine Flux was measured with a module fabricated using the hollow fiber membrane (E), in the same manner as in Example 1, and the wine as the filtrate was evaluated. The results are shown in Table 3.

Example 5

PES having hydroxyphenyl groups at its ends (Sumika EXCEL® 4800P manufactured by Sumitomo Chem tech) (19.0 parts by weight), PVP (Kolidone® K90 manufactured by BASF) (3.0 parts by weight), NMP manufactured by Mitsubishi Chemical Corporation (35.1 parts by weight) and TEG manufactured by MITSUI CHEMICALS, INC. (42.9 parts by weight) were mixed and dissolved at 70° C. for 3 hours to form a homogeneous solution. The system was decompressed at 70° C. from a normal pressure to −700 mmHg, and the system was then immediately sealed so as not to change the composition of the solution due to volatilization of the solvent or the like. The solution was left to stand in this state for 2 hours to be defoamed. The resultant solution was used as a membrane-forming solution. On the other hand, a mixture of NMP (36.0 parts by weight), TEG (44.0 parts by weight) and RO water (20.0 parts by weight) was prepared as a inner liquid. The membrane-forming solution and the inner liquid were discharged from the annular portion and the center portion of a double tube nozzle, respectively. The resulting filament was allowed to pass through an air gap with a length of 20 mm and was then introduced into a coagulating bath filled with an external coagulating liquid comprising a mixture of NMP (13.5 parts by weight), TEG (16.5 parts by weight) and RO water (70.0 parts by weight). In this operation, the nozzle temperature was 63° C., and the temperature of the external coagulating liquid was 55° C. Three cylindrical guides with diameters of 100 mm were used in the coagulating bath so as to gradually change the feeding direction of the hollow fiber membrane. That is, the feeding direction of the hollow fiber membrane was changed at radii of curvature of 50 mm and at three points. The depth of immersion of the hollow fiber membrane in the coagulating bath was maximum 800 mm, and the feeding distance of the hollow fiber membrane in the coagulating bath was 2,000 mm (see FIG. 1). The hollow fiber membrane removed from the coagulating bath was fed to a water washing bath filled with hot water of 300K, a water washing bath filled with hot water of 310K, a water washing bath filled with hot water of 320K and a water washing bath filled with hot water of 330K, in this order. The residence times of the hollow fiber membrane in the respective water washing baths were 0.29 mins., 0.24 mins., 0.21 mins., and 0.19 mins., respectively. The hollow fiber membrane was wound up at a rate of 8.5 m/min. The amounts of the membrane-forming solution and the inner liquid to be discharged were controlled so that the inner diameter of the hollow fiber membrane could be about 1,200 μm (the radius of the hollow portion could be 0.6 mm), and the thickness thereof, about 340 μm. In this operation, the value of H/S defined by the above-described equations [6], [7] and [8] was calculated as follows:

(300×0.29+310×0.24+320×0.21+330×0.19)/(0.6×0.6× 80÷100)=1,011.

The concentration of the organic component in the inner liquid filling the hollow portion of the hollow fiber membrane, found by this step, was 52%.

The wound hollow fiber membrane was made into a bundle of the hollow fiber membranes with lengths of about 1 m, which was then aged at 25° C. for 20 mins., while being filled with the inner liquid. Then, the bundle of the hollow fiber membranes was stood vertically to remove the inner liquid. The bundle of the hollow fiber membranes was immersed in RO water of 80° C. for 60 mins. for heat treatment thereof. After that, the bundle of the hollow fiber membranes was dried with a hot air of 60° C. for 10 hours to obtain a hollow fiber membrane (F) having an inner diameter of 1,186 μm and a thickness of 332 μm. The inner surface, the outer surface and the wall section of the hollow fiber membrane were observed with SEM according to the above-described method. The image analysis of the SEM photograph of the hollow fiber membrane was conducted to determine the porosities and pore diameters of the respective portions of the wall section of the hollow fiber membrane. In this regard, IS means the inner surface of the hollow fiber membrane; Os means the outer surface thereof; and CS1, CS2, CS3, CS4, CS5, CS6, CS7 and CS8 mean the eight portions into which the wall section of the hollow fiber membrane was equally divided from the inner surface to the outer surface. It was found that the hollow fiber membrane (F) had skin layers on its inner and outer surfaces. The values indicating the structure of the membrane are described below:

| | |
|---|---|
| Diameter of pores in IS: | 0.05 μm |
| Porosity of IS: | 17% |
| Diameter of pores in OS: | 0.11 μm |
| Porosity of OS: | 12% |
| Portion of section at which porosity became maximum: | CS3 |
| Diameter of pores in CS3: | 1.53 μm |
| Porosity of CS3: | 59%. |

The inner diameter and thickness of the hollow fiber membrane (F), and the content of PVP in the inner surface of the hollow fiber membrane, the content of PVP in the entire hollow fiber membrane, and the adsorption of polyphenol and the pure water Flux of the hollow fiber membrane are shown in Table 2.

A wine Flux was measured with a module fabricated using the hollow fiber membrane (F) in the same manner as in Example 1, and the wine as the filtrate was evaluated. The results are shown in Table 3.

Comparative Example 2

Figure 7:
FIG. 7 shows the electron microscopic photograph (magnification: 1,000) of the inner surface of a PE-MF membrane of Comparative Example 1.
Figure 8:
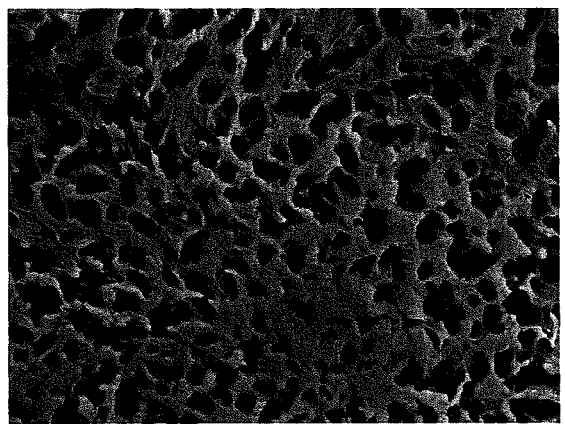
FIG. 8 shows the electron microscopic photograph (magnification: 1,000) of the outer surface of the PE-MF membrane of Comparative Example 1.
Figure 9:
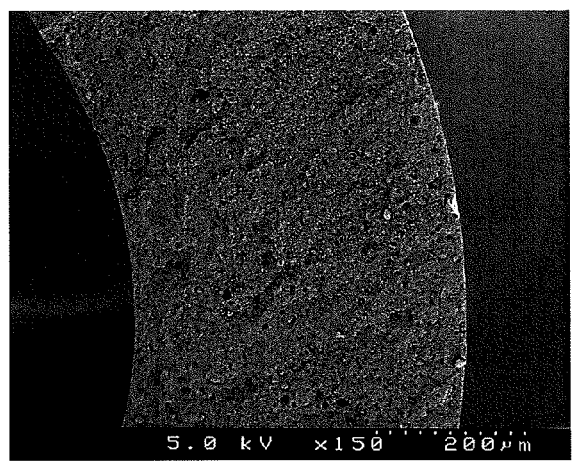
FIG. 9 shows the electron microscopic photograph (magnification: 150) of the section of the PE-MF membrane of Comparative Example 1.

A commercially available polyethylene microfiltration membrane (hereinafter referred to as PE-MF membrane) was observed with SEM in the same manner as in Example 1. The SEM photographs of IS, OS and the entire wall section of the membrane are shown in FIGS. 7, 8 and 9. From the wall section of the membrane shown in FIG. 9, this membrane was found to be a homogeneous symmetric membrane, and no portion having a maximum porosity was found in the wall portion of the membrane. The values indicating the structure of the PE-MF membrane were described below. The adsorption of polyphenol onto the membrane and the pure water Flux, measured in the same manners as in Example 1, are shown in Table 2. A module comprising the PE-MF membrane was used to measure a wine Flux in the same manner as in Example 1, and the wine obtained as a filtrate was evaluated. The results are shown in Table 3. The dBmax, the distribution of pore diameters in the inner surface, the φmax and the DR of the PE-MF membrane were determined in the same manners as in Example 1. The results are shown in Table 3.

| | |
|---|---|
| Diameter of pores in IS: | 0.22 μm |
| Porosity of IS: | 31% |
| Diameter of pores in OS: | 0.22 μm |
| Porosity of OS: | 29% |
| Portion of section at which porosity became maximum: | none. |

Comparative Example 3

Figure 10:
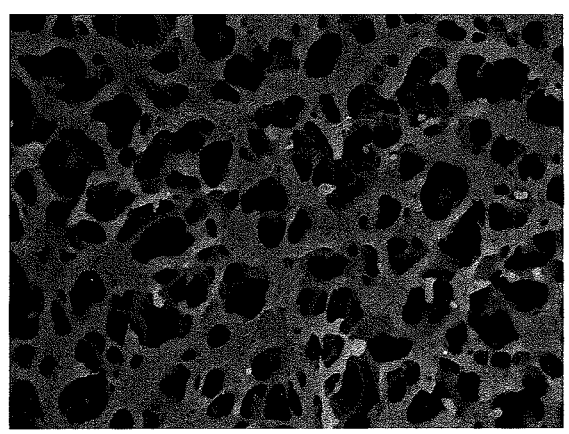
FIG. 10 shows the electron microscopic photograph (magnification: 1,000) of the inner surface of a PVDF-MF membrane of Comparative Example 2.
Figure 1:
Figure 1:
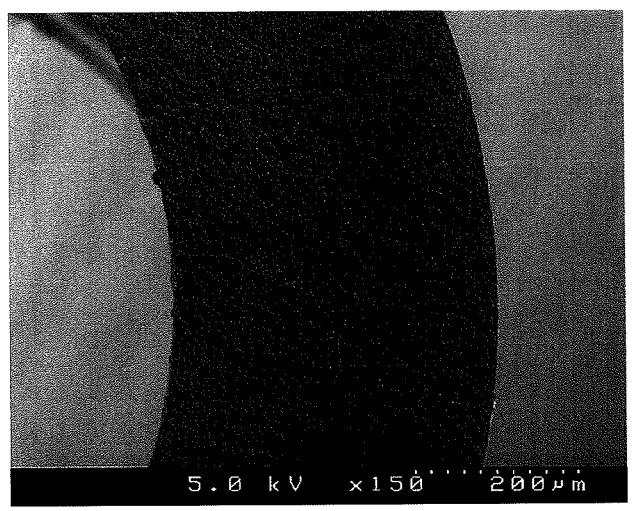

A commercially available polyvinylidene fluoride microfiltration membrane (hereinafter referred to as PVDF-MF membrane) was observed with SEM in the same manner as in Example 1. The SEM photographs of IS, OS and the entire wall section of the membrane are shown in FIGS. 10, 11 and 12. From the wall section of the membrane shown in FIG. 12, this membrane was found to be a homogeneous symmetric membrane, and no portion having a maximum porosity was found in the wall portion of the membrane. The values indicating the structure of the PVDF-MF membrane are described below. The adsorption of polyphenol onto the membrane and the pure water Flux, measured in the same manners as in Example 1, are shown in Table 2. A module comprising the PVDF-MF membrane was used to measure a wine Flux in the same manner as in Example 1, and the wine obtained as a filtrate was evaluated. The results are shown in Table 3. The dBmax, the distribution of pore diameters in the inner surface, the φmax and the DR were determined in the same manners as in Example 4. The results are shown in Table 3.

| | |
|---|---|
| Diameter of pores in IS: | 0.31 μm |
| Porosity of IS: | 35% |
| Diameter of pores in OS: | 0.18 μm |
| Porosity of OS: | 25% |
| Portion of section at which porosity became maximum: | none. |

Comparative Example 4

PES (Sumika EXCEL® 4800P manufactured by Sumitomo Chem tech) (17.3 parts by weight), PVP (Kolidone® K90 manufactured by BASF) (4.7 parts by weight), DMAc (75.0 parts by weight) and RO water (3.0 parts by weight) were mixed and dissolved at 50° C. for 2 hours to form a homogenous solution. The system was decompressed at 50° C. from an atmospheric pressure to −700 mmHg. Immediately after that, the system was sealed so as not to change the composition of the solution due to the volatilization of the solvent or the like, and the solution was left to stand for 2 hours so as to be defoamed. The resulting solution was used as a membrane-forming solution. On the other hand, a mixture of DMAc (40.0 parts by weight) and RO water (60.0 parts by weight) was prepared as a inner liquid. The membrane-forming solution and the inner liquid were discharged from the annular portion and the center portion of a double tube nozzle, respectively, and the resultant filament was allowed to pass through an air gap with a length of 450 mm and was then introduced into a coagulating bath filled with an external coagulating liquid consisting of a mixture of DMAc (20.0 parts by weight) and RO water (80.0 parts by weight). In this operation, the nozzle temperature was 65° C., and the temperature of the external coagulating liquid was 60° C. One rod-like guide with a diameter of 12 mm was used in the coagulating bath to change the feeding direction of the hollow fiber membrane to draw the same from the coagulating bath. The feeding direction of the hollow fiber membrane was changed at a curvature radius of 6 mm and at one point. The immersion depth for the hollow fiber membrane in the coagulating bath was maximum 200 mm, and the feeding distance of the hollow fiber membrane in the coagulating bath was 600 mm.

The hollow fiber membrane drawn from the coagulating bath was fed to a water washing bath filled with hot water of 300K, a water washing bath filled with hot water of 310K, a water washing bath filled with hot water of 320K and a water washing bath filled with hot water of 330K, in this order. The passing times of the hollow fiber membrane in the respective water washing baths were 0.20 mins., 0.027 mins., 0.024 mins., and 0.021 mins., respectively. The hollow fiber membrane was wound up at a rate of 75 m/min. The amounts of the membrane-forming solution and the inner liquid to be discharged were controlled so that the inner diameter of the hollow fiber membrane could be about 200 μm, and the thickness thereof, about 30 μm. In this operation, the value of H/S defined by the above-described equations [6], [7] and [8] was calculated as follows:

$$(300 \times 0.20 + 330 \times 0.027 + 320 \times 0.024 + 310 \times 0.021)/(0.2 \times 0.2 \times 40 + 100) = 5{,}194.$$

The concentration of the organic component in the inner liquid filling the hollow portion of the hollow fiber membrane, found by this step, was less than 1%.

The resultant hollow fiber membrane was wrapped in a polyethylene film embossed at its surface, and was then cut into pieces with lengths of 27 cm to obtain a bundle of the hollow fiber membranes. This bundle of the hollow fiber membranes was immersed in RO water of 80° C. for 30 minutes. This operation was repeated 4 times for heating-and-washing treatment of the bundle of the hollow fiber membranes. The bundle of the wet hollow fiber membranes was subjected to centrifugal dewatering at 600 rpm for 5 minutes, and was exposed to microwave in a microwave generator which had an oven lined with a reflecting plate to carry out uniform heating, and was simultaneously dried for 60 minutes, while the inner pressure of the drier was being reduced to 7 kPa. The output of the microwave was decreased from the initial output of 1.5 kW, by every 0.5 kW at every interval of 20 minutes. By this drying treatment, a hollow fiber membrane (G) with an inner diameter of 196 μm and a thickness of 30 μm was obtained.

The structure of the hollow fiber membrane (G) was observed with SEM in the same manner as in Example 1. The hollow fiber membrane (G) had a skin layer on IS only, and was found to be an asymmetrical membrane in which the porosity increased from its inner surface toward its outer surface. The values indicating the structure of the hollow fiber membrane (G) were described below.

| | |
|---|---|
| Diameter of pores in IS: | 0.01 μm |
| Porosity of IS: | 9% |
| Diameter of pores in OS: | 0.52 μm |
| Porosity of OS: | 14% |
| Portion of section at which porosity became maximum: | none |

The inner diameter and thickness of the hollow fiber membrane (G), and the content of PVP in the inner surface of the membrane, the content of PVP in the entire membrane, the adsorption of polyphenol onto the membrane and the pure water Flux of the membrane, measured in the same manners as in Example 1, are shown in Table 2.

A module comprising the hollow fiber membrane (G) was used to measure a wine Flux in the same manner as in Example 1, and the wine obtained as a filtrate was evaluated. The results are shown in Table 3.

As was apparent from the results of the measurement of the wine permeability, the polymeric porous hollow fiber membranes of the present invention were found to be higher in wine Flux sustainability and recoverability and to be superior in membrane performance sustainability and recoverability. The turbidities of the wines obtained as the filtrates were low, and thus, the polymeric porous hollow fiber membranes of the present invention were found to concurrently exhibit excellent fractionation performance, including excellent permeability to a component to be filtered, and excellent removing ability to a component to be retained (a component not to be filtered). Also, the flavors of the wines obtained as the filtrates were improved in comparison with those of the same wines before the filtration. Thus, the specified arrangement, the specified membrane structure and the optimized interaction with polyphenol, featuring the present invention, are considered to contribute much to the exhibition of these excellent performances.

INDUSTRIAL APPLICABILITY

The polymeric porous hollow fiber membrane of the present invention 1 is applicable as a membrane for treating a variety of aqueous fluids, for example, a membrane for obtaining tap water, a beverage-treating membrane, or a blood-treating membrane. The hollow fiber membranes have excellent fractionation performance and permeability, and the aging degradation of these performances is suppressed, and the membrane performance can be recovered by washing. The hollow fiber membrane having these advantages is expected to significantly contribute to this industrial field.

The polymeric porous hollow fiber membrane of the present invention 2 is applicable as a membrane for treating a variety of aqueous fluids, for example, a membrane for obtaining tap water, a beverage-treating membrane, or a blood-treating membrane. The hollow fiber membrane has excellent fractionation performance and permeability, and the aging degradation of these performances is suppressed, and the membrane performance can be recovered by washing. Further, the interaction of the hollow fiber membrane with polyphenol is optimized. Therefore, the hollow fiber membrane is especially suitable to treat a beverage containing polyphenol. The hollow fiber membrane having these advantages is expected to significantly contribute to this industrial field.

The invention claimed is:

1. A polymeric porous hollow fiber membrane comprising a hydrophobic polymer and a hydrophilic polymer, characterized in that (a) the hollow fiber membrane has skin layers on its inner and outer surfaces;
(b) the diameters of pores in the inner surface are smaller than the diameters of pores in the outer surface;
(c) the porosity increases from the inner surface toward the outer surface, and then decreases from at least one portion having a maximum porosity, of the wall section of the membrane, toward the outer surface;
(d) the hollow fiber membrane has a relationship of 2 [%]≤DR≤20 [%], wherein the critical diameter of a fine particle to be removed, found by a fine particle-passing test, is $\phi$max [μm]; the diameter of the pore in the inner surface is dIS [μm]; and the proportion of the pores with dIS exceeding $\phi$max is DR [%]; and
(e) the content of the hydrophilic polymer in the entire hollow fiber membrane is from 0.5 to 10% by weight;
wherein the following relationships are satisfied:
(i) 1 [% by weight]≤Ca≤10 [% by weight],
(ii) Ca≤Ci and Ca≤Co, and
(iii) Co≤Ci,
wherein the content of the hydrophilic polymer in the entire hollow fiber membrane is Ca [% by weight]; the content of the hydrophilic polymer in the inner surface of the hollow fiber membrane is Ci [% by weight]; and the content of the hydrophilic polymer in the outer surface of the hollow fiber membrane is Co [% by weight].

2. The polymeric porous hollow fiber membrane of claim 1, wherein the following relationships are satisfied:
(a) 0.001 [μm]≤dIS≤1 [μm],
(b) 0.1 [μm]≤dCSmax≤10 [μm],
(c) 5 [%]≤pIS≤30 [%], and
(d) 40 [%]≤pCSmax≤80 [%],
wherein the inner surface of the hollow fiber membrane is IS; a portion having a maximum porosity, of the wall section of the membrane, is CSmax; the diameters of the pores in the respective portions of the membrane are dIS and dCSmax; and the porosities of the respective portions are pIS and pCSmax.

3. The polymeric porous hollow fiber membrane of claim 1, wherein the following relationships are satisfied:
(a) dIS≤dCS1<dCS2≤dCS3≥dCS4>dCS5>dCS6>dCS7>dCS8≥dOS, and
(b) pIS<pCS1≤pCS2<pCS3>pCS4≥pCS5≥pCS6≥pCS7≥pCS8>pOS,
wherein the inner surface of the hollow fiber membrane is IS; the outer surface thereof is OS; eight portions into which the wall section of the membrane is equally divided from the inner surface to the outer surface are CS1, CS2, CS3, CS4, CS5, CS6, CS7 and CS8 in this order from the inner surface; the diameters of the pores in the respective portions are dIS, dOS, dCS1, dCS2, dCS3, dCS4, dCS5, dCS6, dCS7 and dCS8; and the porosities of the respective portions are pIS, pOS, pCS1, pCS2, pCS3, pCS4, pCS5, pCS6, pCS7 and pCS8.

4. The polymeric porous hollow fiber membrane of claim 1, wherein the following relationships are satisfied:
(a) (1/10,000)×F≤dBmax≤(1/4,000)×F, and
(b) 0.05 [μm]≤dBmax≤1 [μm],
wherein the maximum diameter of a pore, found at a bubble point, is dBmax [μm]; and a permeability of the hollow fiber membrane to pure water at 25° C. is F [L/(h·m²·bar).

5. The polymeric porous hollow fiber membrane of claim 1, wherein the hydrophobic polymer is a polysulfone-based polymer.

6. The polymeric porous hollow fiber membrane of claim 1, wherein the hydrophilic polymer is polyvinyl pyrrolidone.

7. A polymeric porous hollow fiber membrane comprising a hydrophobic polymer and a hydrophilic polymer, characterized in that
- (a) the hollow fiber membrane has inner and outer surfaces;
- (b) the hollow fiber membrane has skin layers on its inner and outer surfaces;
- (c) the content of the hydrophilic polymer in the inner surface of the hollow fiber membrane is from 10 to 40% by weight, and the content of the hydrophilic polymer in the entire hollow fiber membrane is from 0.5 to 10% by weight;
- (d) the porosity increases from the inner surface toward the outer surface, and then decreases from at least one portion having a maximum porosity, of the wall section of the membrane, toward the outer surface; and
- (e) the adsorption of polyphenol per a surface area of 1 $m^2$ defined by the inner and outer surfaces of the membrane is from 50 to 500 mg.

8. The polymeric porous hollow fiber membrane of claim 7, which is used to filter a polyphenol-containing beverage.

9. The polymeric porous hollow fiber membrane of claim 7, wherein the following relationships are satisfied:
- (a) $40 \leq D \leq 400$, and
- (b) $400 \leq F \leq 4{,}000$, wherein the thickness of the membrane is D [μm]; and a permeability of the membrane to pure water at 25° C. is F [L/(h·$m^2$·bar)].

10. The polymeric porous hollow fiber membrane of claim 7, wherein the following relationships are satisfied:
- (a) $0.01\ [\mu m] \leq dIS \leq 1\ [\mu m]$,
- (b) $0.1\ [\mu m] \leq dCSmax \leq 10\ [\mu m]$,
- (c) $5\ [\%] \leq pIS \leq 30\ [\%]$, and
- (d) $40\ [\%] \leq pCSmax \leq 80\ [\%]$, wherein the inner surface of the hollow fiber membrane is IS; a portion having a maximum porosity, of the wall section of the membrane, is CSmax; the diameters of the pores in the respective portions of the membrane are dIS and dCSmax; and the porosities of the respective portions are pIS and pCSmax.

11. The polymeric porous hollow fiber membrane of claim 7, which contains substantially no insoluble component.

12. The polymeric porous hollow fiber membrane of claim 7, wherein the hydrophilic polymer is polyvinyl pyrrolidone.

13. The polymeric porous hollow fiber membrane of claim 7, wherein the hydrophobic polymer is a polysulfone-based polymer.

14. The polymeric porous hollow fiber membrane of claim 7, wherein the hydrophobic polymer has a phenolic hydroxyl group.

* * * * *